(12) United States Patent
Nakahori

(10) Patent No.: US 7,405,955 B2
(45) Date of Patent: Jul. 29, 2008

(54) SWITCHING POWER SUPPLY UNIT AND VOLTAGE CONVERTING METHOD

(75) Inventor: Wataru Nakahori, Tokyo (JP)

(73) Assignee: TDK Corporation, Tokyo (JP)

( * ) Notice: Subject to any disclaimer, the term of this patent is extended or adjusted under 35 U.S.C. 154(b) by 117 days.

(21) Appl. No.: 11/439,960

(22) Filed: May 25, 2006

(65) Prior Publication Data

US 2006/0268589 A1 Nov. 30, 2006

(30) Foreign Application Priority Data

May 27, 2005 (JP) ............................. 2005-156412

(51) Int. Cl.
*H02M 1/12* (2006.01)
(52) U.S. Cl. .................. 363/52; 363/17; 363/56.05; 363/98; 323/363; 323/333
(58) Field of Classification Search .............. 363/17, 363/45, 52, 56.01, 56.05, 95, 98, 131, 132; 323/363, 332–334
See application file for complete search history.

(56) References Cited

U.S. PATENT DOCUMENTS

| | | | | |
|---|---|---|---|---|
| 4,858,093 A | * | 8/1989 | Sturgeon | 363/20 |
| 5,055,990 A | * | 10/1991 | Miki et al. | 363/56.05 |
| 5,426,409 A | * | 6/1995 | Johnson | 336/178 |
| 5,619,400 A | * | 4/1997 | Bowman et al. | 363/15 |
| 5,875,103 A | * | 2/1999 | Bhagwat et al. | 363/17 |
| 5,880,944 A | * | 3/1999 | Hickman | 363/65 |
| 6,567,278 B2 | * | 5/2003 | Rufer et al. | 363/17 |
| 7,136,293 B2 | * | 11/2006 | Petkov et al. | 363/126 |

FOREIGN PATENT DOCUMENTS

| JP | WO 00/79674 A1 | 12/2000 |
|---|---|---|
| JP | 3400443 | 2/2003 |
| JP | A 2003-079149 | 3/2003 |
| JP | A 2003-111413 | 4/2003 |

* cited by examiner

*Primary Examiner*—Jessica Han
*Assistant Examiner*—Emily Pham
(74) *Attorney, Agent, or Firm*—Oliff & Berridge, PLC

(57) ABSTRACT

The present invention provides a switching power supply unit and a voltage converting method capable of suppressing a surge voltage applied to an output rectifier element more effectively. Energy in the direction of suppressing reverse voltages (surge voltages) applied to a plurality of rectifier diodes is injected into a rectifier circuit. Reverse voltages applied to the plurality of rectifier diodes are maintained to be lower than a voltage to be inherently applied for a predetermined period. Therefore, rise in the surge voltage is suppressed and rectifier elements (rectifier diodes) having low withstand voltage can be used.

17 Claims, 18 Drawing Sheets

SWITCHING POWER SUPPLY UNIT AND VOLTAGE CONVERTING METHOD

BACKGROUND OF THE INVENTION

1. Field of the Invention

The present invention relates to a switching power supply unit for connecting an output obtained by switching a direct current input voltage to an output winding of a power converting transformer and to a voltage converting method.

2. Description of the Related Art

Hitherto, various types of switching power supply units have been proposed and provided for practical use. Many of them are of a type in which a direct current input voltage is switched by switching operation of a switch circuit connected to an input winding of a power converting transformer, and the switched output is connected to an output winding of the power converting transformer. A voltage appearing in the output winding in association with such switching operation of the switch circuit is rectified by a rectifier circuit, the rectified voltage is converted to a direct current voltage by a smoothing circuit, and the smoothed voltage is output.

In a switching power supply unit of this kind, an output rectifier device such as an output rectifier diode is connected in series with a power transmission line in the rectifier circuit. Therefore, to improve efficiency of the switching power supply unit, it is extremely effective to reduce a loss in the output rectifier diode.

To reduce a loss in the output rectifier diode, it is sufficient to use a diode having a small forward voltage drop. However, the diode having a small forward voltage drop has also a low reverse withstand voltage. Consequently, in the case of using a diode having a small forward voltage drop as the output rectifier diode, it is particularly necessary to suppress the reverse voltage.

In a switching power supply unit of this kind, a reverse voltage which has to be considered the most is a surge (spike) voltage caused by a parasitic element accompanying on/off operation of the switch circuit. The surge voltage is applied as a reverse voltage to the output rectifier diode. As means for suppressing the surge voltage, conventionally, a so-called snubber circuit is known.

For example, the applicant of the present invention has proposed a snubber circuit utilizing LC resonance in Japanese Patent Publication No. 3,400,443. The snubber circuit can suppress the surge voltage to a predetermined voltage or less by utilizing LC resonance.

SUMMARY OF THE INVENTION

The predetermined voltage, that is, the maximum value (peak value) of the surge voltage to be suppressed is 4×Vin/n (where Vin denotes direct current input voltage, and n denotes the ratio between the primary-side winding and the secondary-side winding of the power converting transformer) as described in the paragraphs [0062] to [0065] of the above-mentioned publication. The value is used in the case where the rectifier circuit is of a center tap type. In the case where the rectifier circuit is of a full bridge type, based on the circuit configuration, the predetermined voltage is the half of the value, that is, 2×Vin/n. Although the snubber circuit of Japanese Patent Publication No. 3,400,443 can suppress the surge voltage to a certain degree, there is room for improving the maximum value.

In view of the drawback of the invention, it is desirable to provide a switching power supply unit and a voltage converting method capable of suppressing a surge voltage applied to an output rectifier device more effectively.

A first switching power supply unit as an embodiment of the present invention includes: a first bridge circuit of a full bridge type including four first switching elements and generating an input AC voltage on the basis of a DC input voltage; first capacitative elements each of which is connected in parallel with each of the first switching elements; a first inductor connected to the first bridge circuit so as to form an H bridge and configuring a first resonance circuit in cooperation with the first capacitative elements; a first transformer for transforming the input AC voltage to generate an output AC voltage; a rectifier circuit provided on a secondary side of the first transformer, including a plurality of first rectifier elements, and rectifying the output AC voltage by the plurality of first rectifier elements, thereby generating a DC output voltage; a pair of second capacitative elements connected in series, the pair of second capacitative elements connected in parallel with the first bridge circuit and configuring a second resonance circuit in cooperation with a pair of first switching elements connected in series of the four first switching elements; a second inductor connected to the second bridge circuit so as to form an H bridge and configuring a second resonance circuit in cooperation with the second capacitative elements; a second transformer for transforming an input voltage from the second bridge circuit to generate an output voltage and supplying the output voltage to the rectifier circuit; and a driving circuit for driving the first and second bridge circuits.

In the first switching power supply unit as an embodiment of the invention, an input AC voltage is generated from a DC input voltage applied to the first bridge circuit and is transformed by the first transformer, thereby generating an output AC voltage. The output AC voltage is rectified by the first rectifier elements in the rectifier circuit and the resultant is output as a DC output voltage. The first capacitative element and the first inductor cooperate each other and the second capacitative element and the second inductor cooperate each other to function as LC series resonance circuits, thereby performing first and second resonance operations. In the case where a surge voltage occurs in the first rectifier elements, the current in the direction of amplifying surge voltages accumulated by the first resonance operation and the current in the direction of suppressing the surge voltages accumulated by the second resonance operation are balanced for a certain period. In other words, the energy in the direction of suppressing surge voltage is injected from the second bridge circuit into the rectifier circuit. Therefore, the reverse voltages applied to the first rectifier elements become lower than voltages to be inherently applied and determined by the DC input voltage and the primary-side and secondary-side windings of the first transformer for a certain period, and rise in the surge voltage is suppressed.

In the first switching power supply unit as an embodiment of the invention, preferably, the second bridge circuit further includes third switching elements each of which is connected in parallel with each of the pair of second capacitative elements, the turn ratio between a primary winding and a secondary winding of the first transformer is different from the turn ratio between a primary winding and a secondary winding of the second transformer, and the driving circuit selectively operates the first or second bridge circuits in accordance with magnitude of the DC input voltage. With the configuration, the second bridge circuit can also perform switching operation, and a DC output voltage can be supplied at a voltage conversion ratio different from that in the case of performing switching operation by the first bridge circuit.

Therefore, by selectively operating the first and second bridge circuits in accordance with magnitude of an input voltage, the range of the input voltage based on which a target output voltage can be supplied is widened. In this case, the third switching element may be a field effect transistor, and the second capacitive element may be formed of parasitic capacitance of the field effect transistor. With the configuration, the number of devices used is reduced and the circuit configuration is simplified.

In the first switching power supply unit as an embodiment of the invention, preferably, the second bridge circuit further comprises a second rectifier element connected in a reversed polarity and in parallel with at least one of the pair of second capacitive elements in an opposite direction. With such a configuration, ringing operation when the surge voltage is generated is suppressed. In this case, the second bridge circuit may include a field effect transistor connected in parallel with the second capacitative element, the second rectifier element may be formed of a parasitic diode of the field effect transistor, and the second capacitative element may be formed of parasitic capacitance of the field effect transistor. With such a configuration, the number of devices used is reduced and the circuit configuration is simplified.

In the first switching power supply unit as an embodiment of the invention, the first switching element may be formed of field effect transistors, and the first capacitative element and the first rectifier element may be formed of parasitic capacitance and a parasitic diode of the field effect transistor.

A second switching power supply unit as an embodiment of the present invention includes: a first bridge circuit of a full bridge type including four first switching elements and generating an input AC voltage on the basis of a DC input voltage; first capacitative elements each of which is connected in parallel with each of the first switching elements; a first inductor connected to the first bridge circuit so as to form an H bridge and configuring a first resonance circuit in cooperation with the first capacitative elements; a first transformer for transforming the input AC voltage to generate an output AC voltage; a rectifier circuit provided on a secondary side of the first transformer, including a plurality of first rectifier elements, and rectifying the output AC voltage by the plurality of first rectifier elements, thereby generating a DC output voltage; a second bridge circuit including a pair of second switching elements connected in series and a pair of second capacitative elements connected in series, the second bridge circuit connected in parallel with the first bridge circuit; a second inductor connected to the second bridge circuit so as to form an H bridge and constructing a second resonance circuit in cooperation with the second capacitative elements; a second transformer for transforming an input voltage from the second bridge circuit to generate an output voltage and supplying the output voltage to the rectifier circuit; and a driving circuit for driving the first and second bridge circuits.

In the first switching power supply unit as an embodiment of the invention, the rectifier circuit may be a center tap type rectifier circuit including two first rectifier elements or a full bridge type rectifier circuit including four first rectifier elements. The maximum value (peak value) of the surge voltage is, for example, about 2×Vin/n in the case of the center tap type and about 1×Vin/n in the case of the full bridge type. The maximum value can be made lower than that in the conventional technique.

In the first switching power supply unit as an embodiment of the invention, preferably, the first and second transformers are formed of a single magnetic device, and the magnetic device includes the following components (A) to (E):

(A) a magnetic core including a center leg part and a plurality of outer leg parts, the outer leg parts forming loop magnetic paths in cooperation with the center leg part while sharing the center leg part;
(B) an input center leg coil which is wound around the center leg part and supplied with either the input AC voltage or the input voltage;
(C) an output center leg coil wound around the center leg part and outputting either the output AC voltage or the output voltage;
(D) input outer leg coils each of which is wound around each of the outer leg parts and supplied with the other one of the input AC voltage and the input voltage; and
(E) output outer leg coils each of which is wound around the outer leg part and outputting the other one of the output AC voltage and the output voltage.

The input outer leg coil is formed of a first input outer leg coil part and a second input outer leg coil part which are connected in series, the first input outer leg coil part wound around the outer leg part of a loop magnetic path, and the second input outer leg coil part wound around the outer leg part of another loop magnetic path.

The output outer leg coil is formed of a first output outer leg coil part and a second output outer leg coil part which are connected in series, the first output outer leg coil part wound around the outer leg part of a loop magnetic path and the second output outer leg coil part wound around the outer leg part of another loop magnetic path.

The first and second input outer leg coil parts are wound in the direction of the same polarity so that the numbers of turns of the first and second input outer leg coil parts are equal to each other.

The first and second output outer leg coil parts are wound in the direction of the same polarity so that the numbers of turns of the first and second output outer leg coil parts are equal to each other.

The input outer leg coil is wound around the outer leg part so that magnetic fluxes generated in the plurality of outer leg parts by current flowing in the input outer leg coil may cancel out each other in the center leg part.

The output outer leg coil is wound around the outer leg part so that the magnetic fluxes generated in the plurality of outer leg parts by current flowing in the output outer leg coil may cancel out each other in the center leg part.

In the magnetic device constructed as described above, the magnetic fluxes generated in the plurality of outer leg parts by the current flowing in the outer leg coil cancel out each other in the center leg part. Consequently, voltage is not substantially induced from the outer leg coil to the center leg coil. On the other hand, magnetic properties of an outer leg coil part and an outer leg part around which the outer leg coil part is wound and magnetic properties of another outer leg coil part and another outer leg part around which the another outer leg coil part is wound are the same in relation with the center leg part. Therefore, the magnetic fluxes generated in the plurality of outer leg parts by the current flowing in the center leg coil also cancel out each other in the outer leg parts. Irrespective of the fact that the center leg coil and the outer leg coil are wound around the common magnetic coil, they do not exert influence on each other. Thus, the first and second transformers can be constructed by a single magnetic device.

A third switching power supply unit as an embodiment of the invention includes: a bridge circuit of a full bridge type for generating an input AC voltage by switching a DC input voltage; a transformer for transforming the input AC voltage to generate an output AC voltage; a rectifier circuit provided on a secondary side of the transformer, including a plurality of rectifier elements, and rectifying the output AC voltage by the plurality of rectifier elements, thereby generating a DC output voltage; a surge voltage suppressing circuit connected in parallel with the bridge circuit and injecting surge voltage suppressing energy into the rectifier circuit, the surge voltage suppressing energy suppressing a surge voltage applied to the rectifier elements; and a driving circuit for driving the bridge circuit and the surge voltage suppressing circuit.

A voltage converting method as an embodiment of the invention, which is applied to a switching power supply unit, includes the steps of: generating an input AC voltage through switching a DC input voltage by a bridge circuit of a full bridge type; generating an output AC voltage through transforming the input AC voltage by a transformer; generating a DC output voltage through rectifying the output AC voltage by a rectifier circuit, the rectifier circuit provided on a secondary side of the transformer and including a plurality of rectifier elements; and injecting surge voltage suppressing energy into the rectifier circuit by a surge voltage suppressing circuit connected in parallel with the bridge circuit, the surge voltage suppressing energy suppressing a surge voltage applied to the rectifier elements.

In the second switching power supply unit and the voltage converting method as an embodiment according to the invention, an input AC voltage is generated from a DC input voltage applied to the bridge circuit and is transformed by the transformer, thereby generating an output AC voltage. The output AC voltage is rectified by the rectifier elements in the rectifier circuit and the resultant voltage is output as a DC output voltage. The energy in the direction of suppressing the surge voltage applied to the rectifier elements is injected into the rectifier circuit by the surge voltage suppressing circuit. Therefore, reverse voltages applied to the rectifier elements become lower than a voltage to be inherently applied which is determined by the DC input voltage and the primary-side and secondary-side windings of the transformer for a certain period. Thus, rise in the surge voltage is suppressed as compared with the conventional technique.

The second switching power supply unit as an embodiment of the invention can be configured so that the driving circuit drives the bridge circuit and the surge voltage suppressing circuit so that the surge voltage suppressing energy has a phase opposite to that of energy which amplifies the surge voltage supplied from the bridge circuit. The driving circuit can also drive the bridge circuit and the surge voltage suppressing circuit so that a reverse voltage applied to the rectifier element maintains, for a certain period, to be lower than a voltage determined based on the DC input voltage and the primary-side and secondary-side windings of the transformer by balancing first current and second current, the first current supplied from the bridge circuit and flowing in the direction of amplifying the surge voltage, the second current flowing in the direction of suppressing the surge voltage based on the surge voltage suppressing energy. Further, the driving circuit can drive the bridge circuit and the surge voltage suppressing circuit so that a reverse voltage applied to the rectifier element rises step by step through the injection of the surge voltage suppressing energy.

In the switching power supply unit and the voltage converting method as an embodiment of the invention, the energy in the direction of suppressing the surge voltage applied to the rectifier elements is injected into the rectifier circuit. Consequently, the reverse voltage applied to the rectifier elements can be made lower than a voltage to be inherently applied for a certain period, and rise in the surge voltage can be suppressed more effectively.

Other and further objects, features and advantages of the invention will appear more fully from the following description.

DETAILED DESCRIPTION OF THE PREFERRED EMBODIMENTS

The best modes for carrying out of the present invention (hereinbelow, simply called embodiments) will be described in detail hereinbelow with reference to the drawings.

First Embodiment

Figure 1:
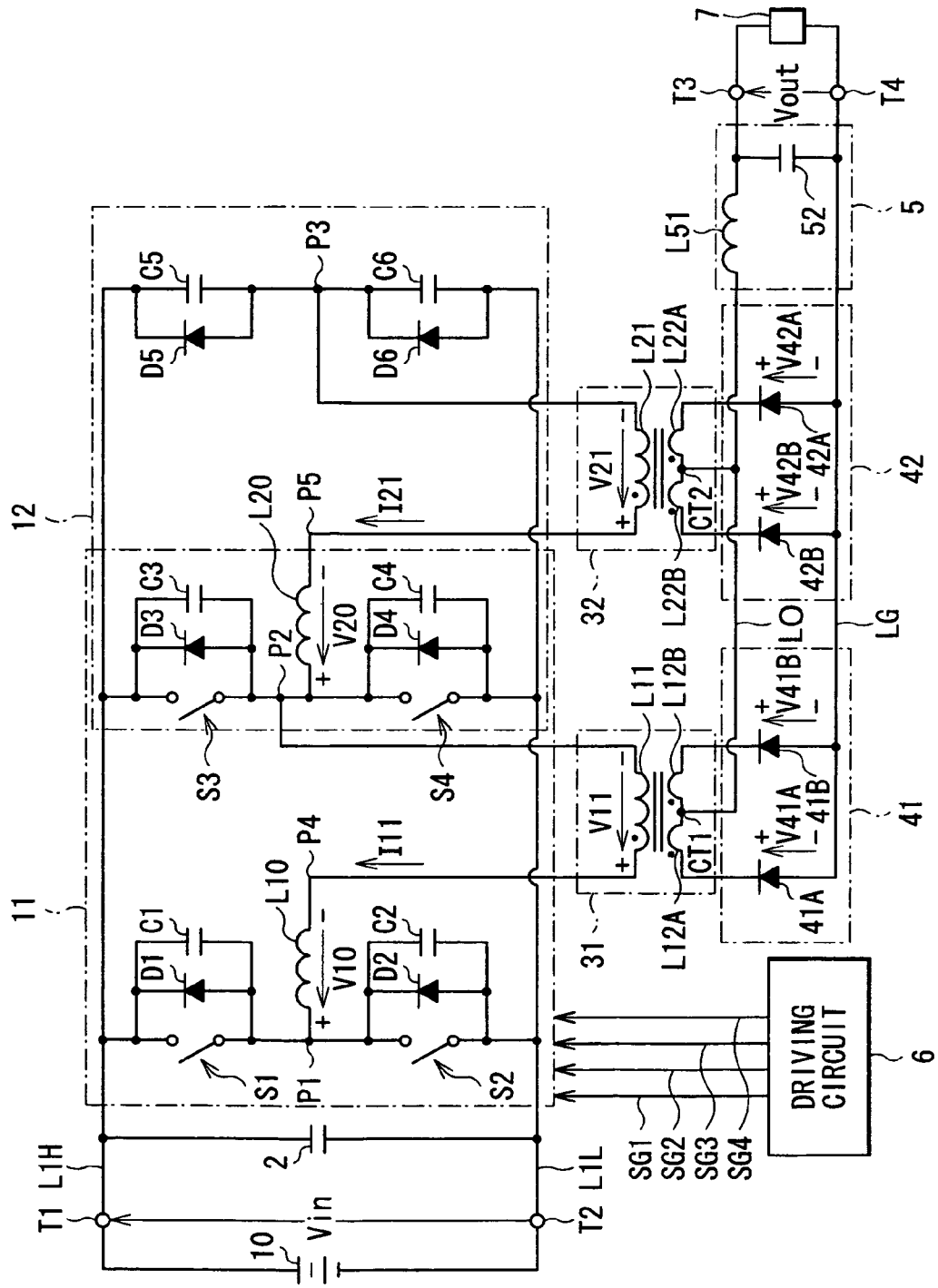
FIG. 1 is a circuit diagram showing the configuration of a switching power supply unit according to a first embodiment of the invention.

FIG. 1 shows a configuration of a switching power supply unit according to a first embodiment of the invention. The switching power supply unit functions as a DC-DC converter for converting a high DC input voltage Vin supplied from a high-voltage battery 10 to a lower DC output voltage Vout, and supplying the DC output voltage Vout to a not-shown low-voltage battery to drive a load 7. Since a voltage converting method according to the first embodiment is embodied by the switching power supply unit according to the embodiment, it will be also described below.

The switching power supply unit has a first bridge circuit 11, a second bridge circuit 12 and an input smoothing capacitor 2 provided between a primary-side-high-voltage line L1H and a primary-side-low-voltage line L1L, an inductor L10 for resonance connected to the first bridge circuit 11 so as to form an H bridge, an inductor L20 for resonance connected to the second bridge circuit 12 so as to form an H bridge, a transformer 31 having a primary-side winding L11 and secondary-side windings L12A and L12B, and a transformer 32 having a primary-side winding L21 and secondary-side windings L22A and L22B. Across an input terminal T1 of the primary-side high-voltage line L1H and an input terminal T2 of the primary-side-low-voltage line L1L, the DC input voltage Vin output from the high-voltage battery 10 is applied. The switching power supply unit also has a rectifier circuit 41 provided on a secondary side of the transformer 31, a rectifier circuit 42 provided on a secondary side of the transformer 32, a smoothing circuit 5 connected to the rectifier circuits 41 and 42, and a driving circuit 6 for driving the first and second bridge circuits 11 and 12.

The first bridge circuit 11 has four switching elements S1 to S4, and capacitors C1 to C4 and diodes D1 to D4 connected in parallel with the switching elements S1 to S4, respectively, and has a full-bridge circuit configuration. Concretely, one end of the switching element S1 and one end of the switching element S2 are connected to each other, and one end of the switching element S3 and one end of the switching element S4 are connected to each other. The other ends of the switching elements S1 and S3 are connected to each other and connected to the input terminal T1, and the other ends of the switching elements S2 and S4 are connected to each other and connected to the input terminal T2. With such a configuration, the first bridge circuit 11 converts the DC input voltage Vin applied across the input terminals T1 and T2 to an input AC voltage V11 in accordance with drive signals SG1 to SG4 supplied from the driving circuit 6.

The second bridge circuit 12 is connected to the first bridge circuit 11 in parallel and has a pair of switching elements S3 and S4 connected in series, the capacitors C3 and C4 and the diodes D3 and D4 connected in parallel with the switching elements S3 and S4, respectively, a pair of capacitors C5 and C6 connected in series, and diodes D5 and D6 connected in parallel with the capacitors C5 and C6. Among the elements, the switching elements S3 and S4, the capacitors C3 and C4, and the diodes D3 and D4 are also used for the first bridge circuit 11, and the bridge circuits 11 and 12 have configurations including common parts. One end of the capacitor C5 and one end of the capacitor C6 are connected to each other at a connection point P3, the other end of the capacitor C5 is connected to the other ends of the switching elements S1 and S3, and the other end of the capacitor C6 is connected to the other ends of the switching elements S2 and S4. The anode of the diode D5 is connected to one end of the capacitor C5 and the cathode is connected to the other end of the capacitor C5. The anode of the diode D6 is connected to the other end of the capacitor C6 and the cathode is connected to one end of the capacitor C6. With such a configuration, as will be described later, the first bridge circuit 11 injects energy (current or voltage) in the direction of suppressing surge voltage applied to the rectifier diodes in the rectifier circuits 41 and 42 to the rectifier circuits 41 and 42 via the transformer 32.

As the switching elements, for example, MOS-FETs (Metal Oxide Semiconductor-Field Effect Transistors), IGBTs (Insulated Gate Bipolar Transistors), or the like are used. In the case of using MOS-FETs as the switching elements, as the capacitors C1 to C4 and the diodes D1 to D4, parasitic capacitors or parasitic diodes of the MOS-FETs can be used. As the capacitors C5 and C6, junction capacitance of the diodes D5 and D6 may be used. In the case of using such a configuration, it becomes unnecessary to provide the capacitors C1 to C6 and the diodes D1 to D4, so that the circuit configuration can be simplified.

The input smoothing capacitor 2 is provided to smooth the DC input voltage Vin input from the input terminals T1 and T2 and, as will be described later, an LC series resonance circuit is constructed by the input smoothing capacitor 2 and the inductors L10 and L20.

One end of the inductor L10 is connected to a connection point P1, and the other end is connected to one end of the primary-side winding L11 of the transformer 31 at a connection point P4. The inductor L10 and the capacitors C1 to C4 in the first bridge circuit 11 construct an LC series resonance circuit (first resonance circuit). By utilizing the resonance characteristic of the first resonance circuit, as will be described later, a short-circuit loss in the switching elements S1 to S4 is suppressed, and energy (current or voltage) in the direction of amplifying the surge voltage applied to the rectifier diodes in the rectifier circuits 41 and 42 is supplied to the amplifier circuits 41 and 42 via the transformer 31. In place of the inductor L10 or in addition to the inductor L10, leakage inductance (not shown) of the primary-side winding L11 in the transformer 31 may be used.

On the other hand, one end of the inductor L20 is connected to a connection point P2, and the other end is connected to one end of the primary-side winding L21 of the transformer 32 at a connection point P5. The inductor L20 and the capacitors C5 and C6 in the second bridge circuit 12 construct an LC series resonance circuit (second resonance circuit). By utilizing the resonance characteristic of the second resonance circuit, energy in the direction of suppressing the surge voltage applied to the rectifier diodes in the rectifier circuits 41 and 42 is supplied to the amplifier circuits 41 and 42. Like the inductor L10, in place of the inductor L20 or in addition to the inductor L20, leakage inductance (not shown) of the primary-side winding L21 in the transformer 32 may be used.

On the other hand, one ends of the secondary-side windings L12A and L12B of the transformer 31 are connected to each other at a center tap CT1. The center tap CT1 is led along an output line LO to an output terminal T3 via the rectifier circuit 42 and the smoothing circuit 5. That is, the rectifier circuit 41 which will be described later is of a center tap type. The transformer 31 drops the input AC voltage V11 generated by the first bridge circuit 11 and outputs output AC voltages whose phases are different from each other by 180 degrees from the ends of the pair of secondary-side windings L12A and L12B. The degree of voltage drop in this case is determined by the turn ratio between the primary-side winding L11 and the secondary-side windings L12A and L12B.

On the other hand, one ends of the secondary-side windings L22A and L22B of the transformer 32 are connected to each other at a center tap CT2. The center tap CT2 is led along the output line LO to the output terminal T3 via the smoothing circuit 5. That is, the rectifier circuit 42 which will be described later is also of a center tap type. The transformer 32 drops the input voltage V12 generated by the first bridge circuit 12 and supplies output voltages whose phases are different from each other by 180 degrees from the ends of the pair of secondary-side windings L22A and L22B to the rectifier circuits 41 and 42. The degree of voltage drop in this case is also determined by the turn ratio between the primary-side winding L21 and the secondary-side windings L22A and L22B.

The rectifier circuit 41 is a single-phase full-wave rectifier constructed by a pair of rectifier diodes 41A and 41B. The cathode of the rectifier diode 41A is connected to the other end of the secondary-side winding L12A of the transformer 31, and the cathode of the rectifier diode 41B is connected to the other end of the secondary-side winding L12B of the transformer 31. The anodes of the rectifier diodes 41A and 41B are connected to each other and connected to a ground line LG. That is, the rectifier circuit 41 has a center-tap-type anode-common-connection configuration. The rectifier circuit 41 rectifies each of half wave periods of the output AC voltage from the transformer 31 by the rectifier diodes 41A and 41B to obtain DC voltage.

On the other hand, the rectifier circuit 42 is provided between the rectifier circuit 41 and the smoothing circuit 5 on the output line LO and the ground line LG, and is a single-phase full-wave rectifier constructed by the pair of rectifier diodes 42A and 42B. The cathode of the rectifier diode 42A is connected to the other end of the secondary-side winding L22A of the transformer 32, and the cathode of the rectifier diode 42B is connected to the other end of the secondary-side winding L22B of the transformer 32. The anodes of the rectifier diodes 42A and 42B are connected to each other and connected to the ground line LG. That is, the rectifier circuit 41 has a center-tap anode-common-connection configuration. The rectifier circuit 41 rectifies each of half wave periods of the output voltage from the transformer 32 by the rectifier diodes 42A and 42B to obtain DC voltage.

As each of the rectifier diodes 41A, 41B, 42A, and 42B, a parasitic diode of a MOS-FET may be used. In the case of using parasitic diodes of MOS-FETs as the rectifier diodes 41A, 41B, 42A, and 42B, preferably, the MOS-FETs are turned on synchronously with periods in which the parasitic diodes of the MOS-FETs are made conductive for the reason that the voltages can be rectified with a smaller voltage drop.

The smoothing circuit 5 includes a choke coil L51 and an output smoothing capacitor 52. The choke coil L51 is inserted in the output line LO. One end of the choke coil L51 is connected to the center taps CT1 and CT2 and the other end of the choke coil L51 is connected to the output terminal T3 of the output line LO. The smoothing capacitor 52 is connected between the output line LO (concretely, the other end of the choke coil L51) and the ground line LG. An output terminal T4 is provided at an end of the ground line LG. With such a configuration, the smoothing circuit 5 smoothes the DC voltage rectified by the rectifier circuit 41, thereby generating the DC output voltage Vout. The DC output voltage Vout is supplied from the output terminals T3 and T4 to a low-voltage battery (not shown).

The driving circuit 6 is provided to drive the switching elements S1 to S4 in the first and second bridge circuits 11 and 12. Concretely, the driving circuit 6 supplies the drive signals SG1 to SG4 to the switching elements S1 to S4 to turn on/off the switching elements S1 to S4. The driving circuit 6 performs phase control on the switching elements S1 to S4 as will be described later to properly set the phase difference, thereby stabilizing the DC output voltage Vout.

The first bridge circuit 11 corresponds to a concrete example of "first bridge circuit" and "bridge circuit" in the present invention. The second bridge circuit 12 corresponds to a concrete example of "second bridge circuit" and "surge voltage suppressing circuit" in the present invention. The switching elements S1 to S4 correspond to concrete examples of "first switching element". The capacitors C1 to C4 correspond to a concrete example of "first capacitive elements" in the invention. The capacitors C5 and C6 correspond to a concrete example of "second capacitive elements" in the invention. The diodes D5 and D6 each correspond to a concrete example of "second rectifier element" in the invention. The transformer 31 corresponds to a concrete example of "first transformer" and "transformer" in the invention. The transformer 32 corresponds to a concrete example of "second transformer" in the invention. The inductor L10 corresponds to a concrete example of "first inductor" in the invention. The inductor L20 corresponds to a concrete example of "second inductor" in the invention. The rectifier circuit 41 corresponds to a concrete example of "rectifier circuit" in the invention, and the rectifier diodes 41A and 41B correspond to a concrete example of "first rectifier element" in the invention.

Next, the operation of the switching power supply unit having such a configuration will be described. First, the basic operation of the switching power supply unit will be described.

The bridge circuit 11 switches the DC input voltage Vin supplied from the high-voltage battery 10 via the input terminals T1 and T2, thereby generating the input AC voltage V11, and supplies the input AC voltage V11 to the primary-side winding L11 of the transformer 31. From the secondary-side windings L12A and L12B of the transformer 31, an output AC voltage transformed (in this case, dropped) is obtained.

The rectifier circuit 41 rectifies the output AC voltage by the rectifier diodes 41A and 41B. As a result, a rectified output is generated between the center tap CT1 (output line LO) and the connection point (ground line LG) of the rectifier diodes 41A and 41B.

The smoothing circuit 5 smoothes the rectified output generated between the center tap CT1 and the rectifier diodes 41A and 41B, and outputs the DC output voltage Vout from the output terminals T3 and T4. The DC output voltage Vout is supplied to a not-shown low-voltage battery and the load 7 is driven.

Referring now to FIGS. 2 to 10, the operation of suppressing the surge voltage applied to the rectifier diodes 41A, 41B, 42A, and 42B in the rectifier circuits 41 and 42 as main feature of the embodiment will be described in detail.

Figure 2:
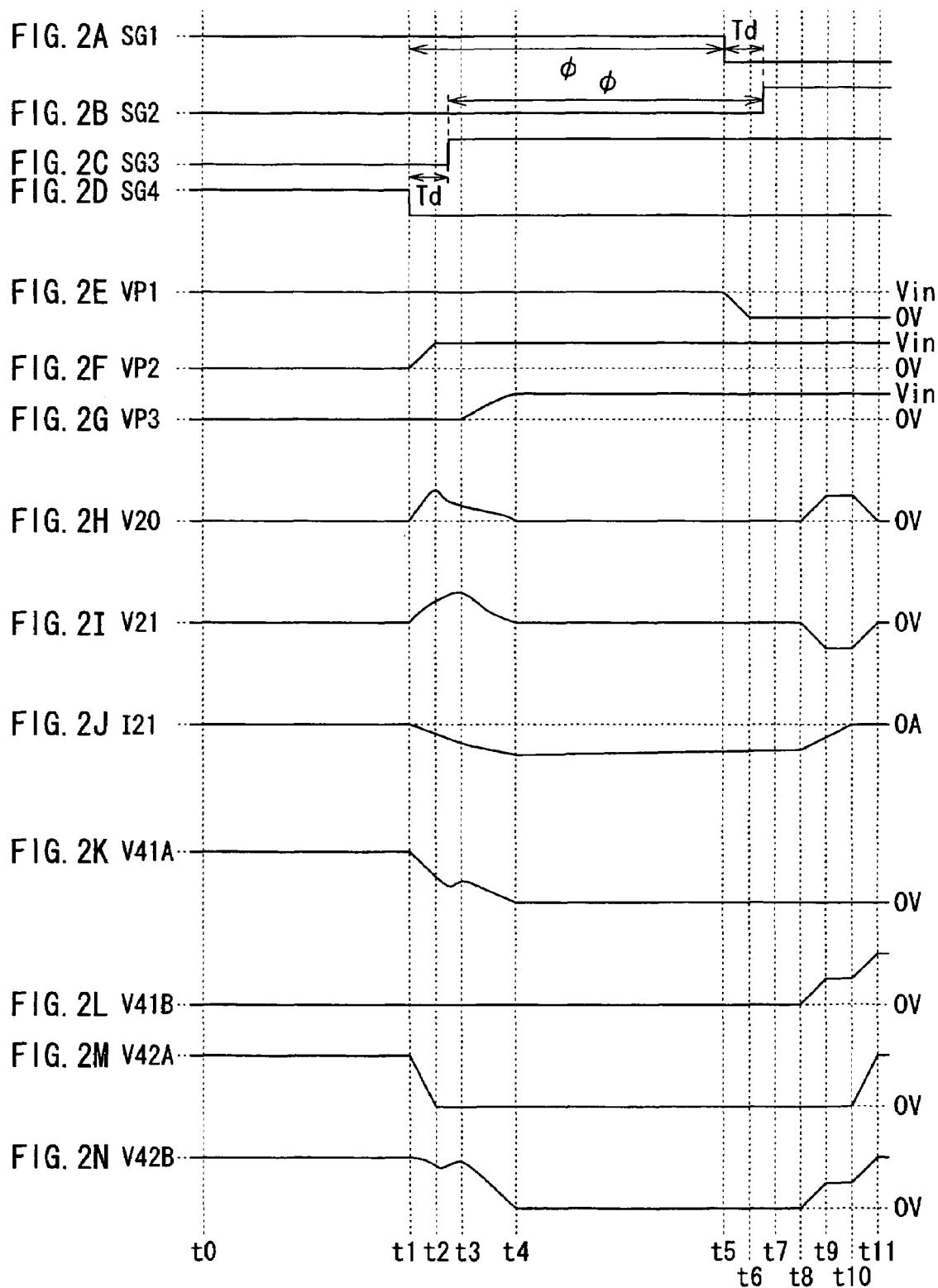
FIG. 2 is a timing waveform chart illustrating operations of the switching power supply unit of FIG. 1.

FIG. 2 is a timing waveform chart (time t0 to t11) of voltage waveforms of parts in the switching power supply unit of FIG. 1. (A) to (D) in the diagram show voltage waveforms of the drive signals SG1 to SG4, (E) to (G) show potentials VP1 to VP3 at the connection points P1 to P3, (H) shows a voltage V20 across the inductor L20, (I) and (J) indicate a voltage V21 across the primary-side winding L21 of the transformer 32 and a current I21 flowing between the both ends, and (K) to (N) indicate reverse voltages V41A, V41B, V42A, and V42B applied across the anodes and cathodes of the rectifier diodes 41A, 41B, 42A, and 42B, respectively. The directions of the voltages are as shown by the arrows in FIG. 1. The direction from "−" to "+" is a forward direction. The directions of the currents are also as shown by the arrows in FIG. 1.

FIGS. 3 to 9 show operation states of the switching power supply unit at the timings (t0 to t11) in FIG. 2. FIG. 10 show voltage waveforms in parts after the timings illustrated in FIG. 2 (at timings t11 (t20) to t31 (t0)). The timings shown in FIGS. 2 and 10 correspond to half cycles of the operation in the switching power supply unit. Combination of the operations corresponds to operations in one cycle.

First, referring to FIGS. 2 to 9, the operations in the first half cycle will be described.

With respect to the drive signals SG1 to SG4 ((A) to (D) in FIG. 2) of the switching elements S1 to S4, it is understood that the switching elements S1 to S4 are paired. Concretely, the switching elements S1 and S2 are controlled to be turned on at fixed timings on the time base and are therefore called "fixed-side switching elements". The switching elements S3 and S4 are controlled to be turned on at variable timings on the time base and are therefore called "shift-side switching elements".

The switching elements S1 to S4 are driven at timing and in combinations that the input terminals T1 and T2 to which the DC input voltage Vin is applied are not electrically short-circuited in any state of the switching operation. Concretely, the switching elements S3 and S4 (fixed-side switching elements) are not turned on simultaneously, and the switching elements S1 and S2 (shift-side switching elements) are not also turned on simultaneously. A time interval required to avoid simultaneous turn-on of the switching elements is called dead time "Td" (FIG. 2).

The switching elements S1 and S4 have a period in which they are ON simultaneously. In the period in which the switching elements S1 and S4 are simultaneously ON, the primary-side winding L11 of the transformer 31 is excited. The switching elements S1 and S4 operate so as to have a switching phase difference φ by using the switching element S1 (fixed-side switching element) as a reference (FIG. 2). Similarly, the switching elements S2 and S3 have a period in which they are simultaneously ON. In the period in which they are simultaneously ON, the primary-side winding L11 of the transformer 31 is excited in the direction opposite to that in the above case. The switching elements S2 and S3 operate so as to have a switching phase difference φ by using the switching element S2 (fixed-side switching element) as a reference. Further, when the switching phase difference φ between the switching elements S1 and S4 and the switching phase difference φ between the switching elements S2 and S3 are controlled, the time in which the switching elements S1 and S4 are simultaneously ON and the time in which the switching elements S2 and S3 are simultaneously ON change, respectively. Accordingly, the duty ratio of the input AC voltage V11 applied to the primary-side winding L11 of the transformer 31 changes, and the DC output voltage Vout is stabilized.

Figure 3:
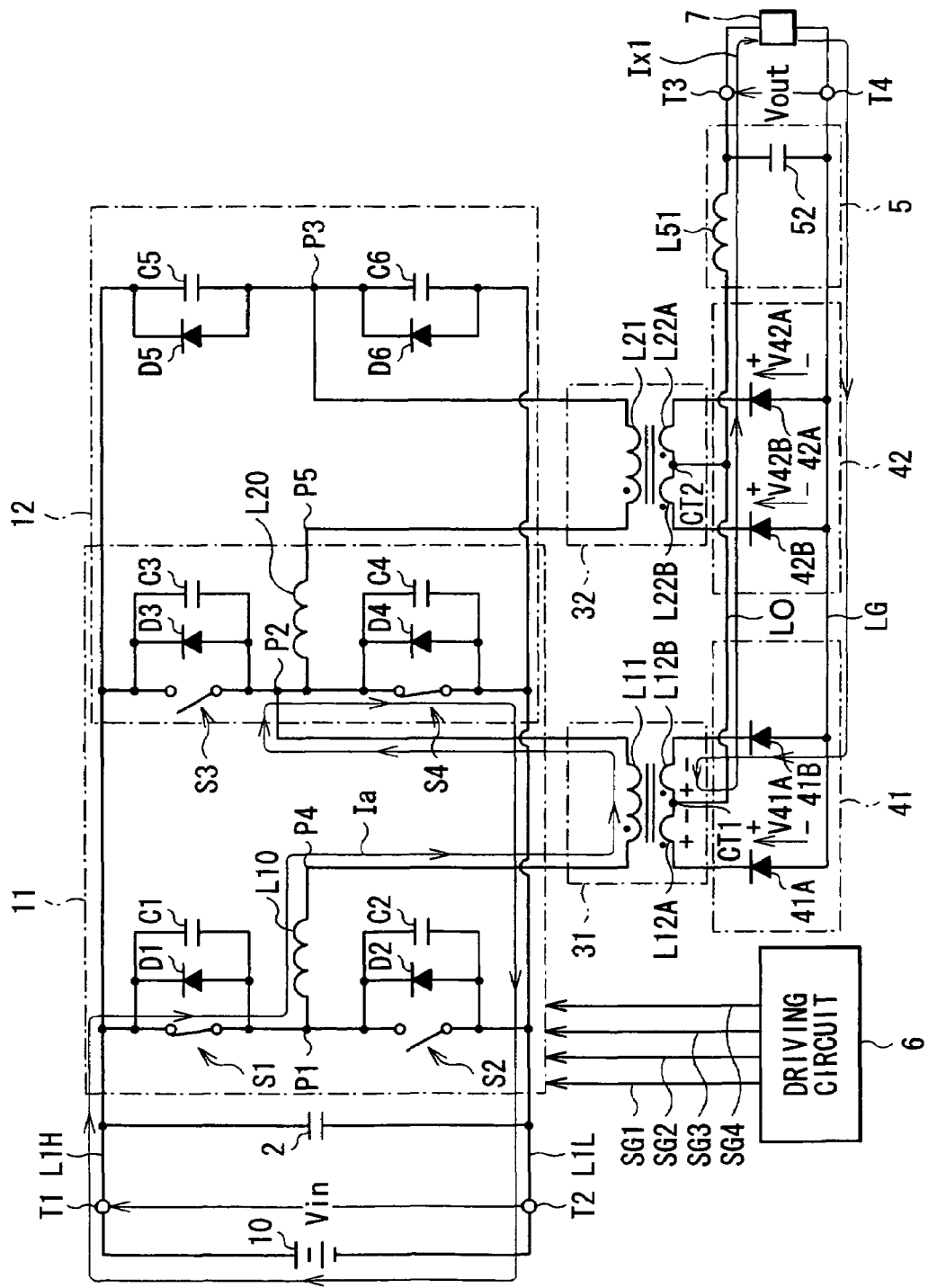
FIG. 3 is a circuit diagram illustrating operations of the switching power supply unit of FIG. 1.

First, in the period between the timings t0 and t1 shown in FIG. 3, the switching elements S1 and S4 are in the on state ((A) and (D) in FIG. 2), and the switching elements S2 and S3 are in the off state ((B) and (C) in FIG. 2). The potential VP1 at the connection point P1 is equal to Vin (VP1=Vin) ((E) in FIG. 2), and the potential VP2 at the connection point P2 is equal to the potential VP3 at the connection point P3 and is equal to 0V (VP2=VP3=0V) ((F) and (G) in FIG. 2). Consequently, the voltage V11 in the negative direction is generated across the primary-side winding L11 of the transformer 31, and the voltage V21 across the primary-side winding L21 of the transformer 32 is equal to the voltage V20 across the inductor L20 and is equal to zero (V21=V20=0V) ((I) and (H) in FIG. 2), so that the current I21 flowing between both ends of the primary-side winding L21 is 0 A ((J) in FIG. 2). Therefore, a loop current Ia as shown in FIG. 3 flows in the first bridge circuit 11, so that the inductor L10 is exited and power is transmitted from the primary side to the secondary side of the transformer 31. A loop current Ix1 flows to the secondary side of the transformer 31 via the rectifier diode 41B and the choke coil L51, and the load 7 is driven. In the period, forward voltage is applied to the rectifier diode 41B and the reverse voltage V41B becomes 0V ((L) in FIG. 2). To the other rectifier diodes 41A, 42A, and 42B, reverse voltage is applied ((K), (M), and (N) in FIG. 2).

Figure 4:
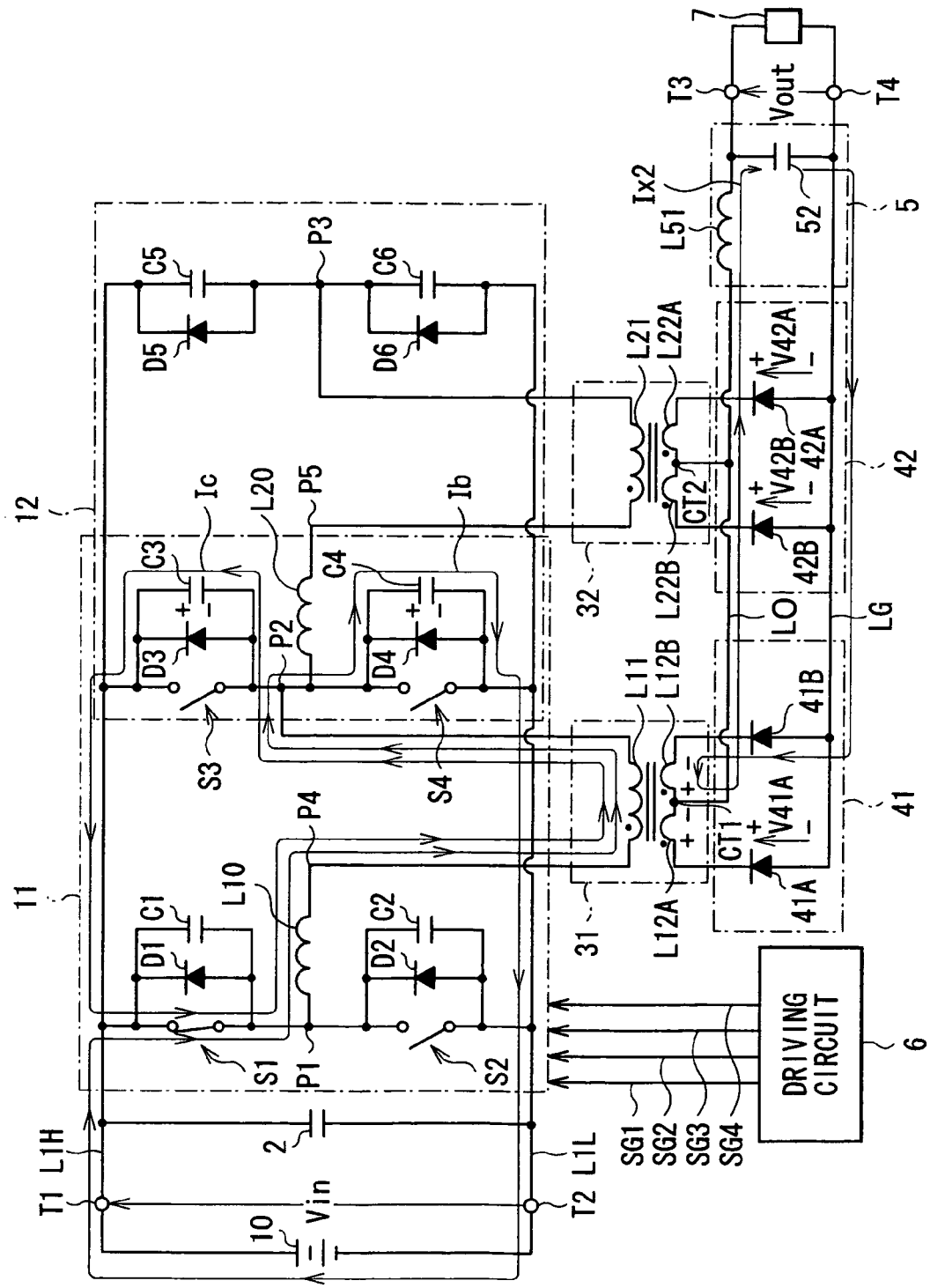
FIG. 4 is a circuit diagram illustrating operations of the switching power supply unit subsequent to FIG. 3.

Next, in the period between the timings t1 and t2 shown in FIG. 4, the switching element S4 is turned off at the time t1 ((D) in FIG. 2). The capacitors C3 and C4, the inductor L10, and the choke coil L51 cooperate to construct an LC series resonance circuit (first resonance circuit), and first resonance operation is performed. The loop currents Ib and Ic as shown in FIG. 4 flow, the capacitor C3 is discharged and, on the other hand, the capacitor C4 is charged. Consequently, the potential VP2 at the connection point P2 gradually increases and becomes equal to Vin at the time t2 ((F) in FIG. 2). By the resonance operation, the loop current Ix2 as shown in FIG. 4 flows also to the secondary side of the transformer 31, the reverse voltages V41A and V42B of the rectifier diodes 41A and 42B drop gradually, and the reverse voltage V42A of the rectifier diode 42A becomes 0V at the time t2 ((K), (M), and (N) in FIG. 2).

Figure 5:
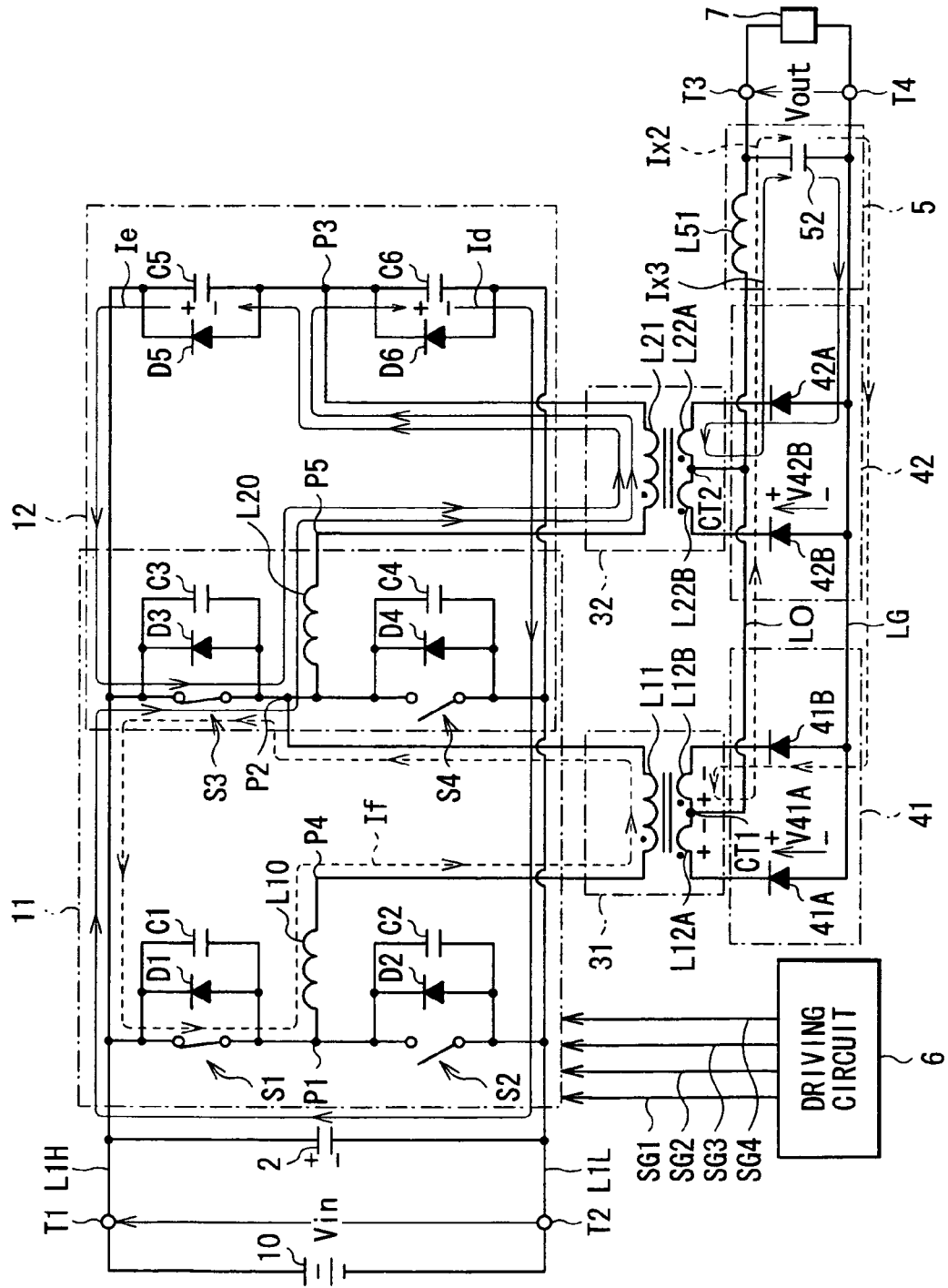
FIG. 5 is a circuit diagram illustrating operations of the switching power supply unit subsequent to FIG. 4.

In the period between the time t2 and the time t5 shown in FIG. 5, first, VP2 becomes Vin at the time t2 and, after that, the switching element S3 is turned on ((C) in FIG. 2), thereby performing zero volt switching (ZVS) operation. As a result, a short-circuit loss in the switching element S3 is suppressed. At this instance, the loop current If as shown in FIG. 5 flows to the first bridge circuit 11 and V2P becomes larger than VP3 (VP2>VP3), so that loop currents Id and Ie flow in the second bridge circuit 12. The capacitor C5 is discharged, the capacitor C6 is charged, and the inductor L20 is excited. The capacitors C5 and C6 and the inductor L20 cooperate to construct an LC series resonance circuit (second resonance circuit), second resonance operation is performed, and the potential VP3 at the connection point P3 gradually increases ((G) in FIG. 2). In association with the above, the voltage V20 across the inductor L20 and the voltage V21 across the primary-side winding L21 of the transformer 32 also gradually increase ((H) and (I) in FIG. 2), and voltage is generated also in the secondary-side windings L22A and L22B of the transformer 32. The timing at which the voltage V22A across the secondary-side winding L22A becomes equal to the potential VLO of the output line LO corresponds to the time t3.

At the time t3 and later, the voltage V22A across the secondary-side winding L22A is higher than the voltage V12B across the secondary-side winding L12B of the transformer 31, so that the voltage V22A across the secondary-side winding L22A is applied also to the secondary-side winding L12B. Accordingly, the potential VP4 at the connection point P4 becomes higher than the potential VP1 at the connection point P1. Since VP1=VP2=Vin in this period ((E) and (F) in FIG. 2), V10=V11 and VP4<VP2, and the voltage V10 in the direction of decreasing the current I10 in the inductor L10 flowing from the connection point P4 to the connection point P2 is generated. Therefore, due to decrease in the current I10, the current I11 in the primary-side winding L11 in the transformer 31 decreases, and the current Ix2 flowing in the secondary-side winding L12B also decreases. In this case, the choke coil L51 can be regarded as a constant current source and the reverse voltages V41A and V42B are applied to the rectifier diodes 41A and 42B, respectively ((K) and (N) in FIG. 2), so that the current Ix3 increases as the current Ix2 decreases.

Since the potential VP3 at the connection point P3 gradually increases as described above, the potential difference between the potential VP3 and the potential VP2 at the connection point P2 decreases. In association with the decrease, the voltage V21 across the primary-side winding L21 of the transformer 32 also decreases ((I) in FIG. 2), and the voltage V22A across the secondary-side winding L22A and the potential VLO of the output line LO also decrease. The timing when VP3, VP2, and Vin become equal to each other (VP3=VP2=Vin) corresponds to the time t4 ((G) in FIG. 2).

At the time t5, V20=V21=V22A=VLO=0V ((H) and (I) in FIG. 2), the diode D5 is made conductive, and currents Id to If are held. The period between the time t4 and the time t5 is a commutation period of current from the choke coil L51

Figure 6:
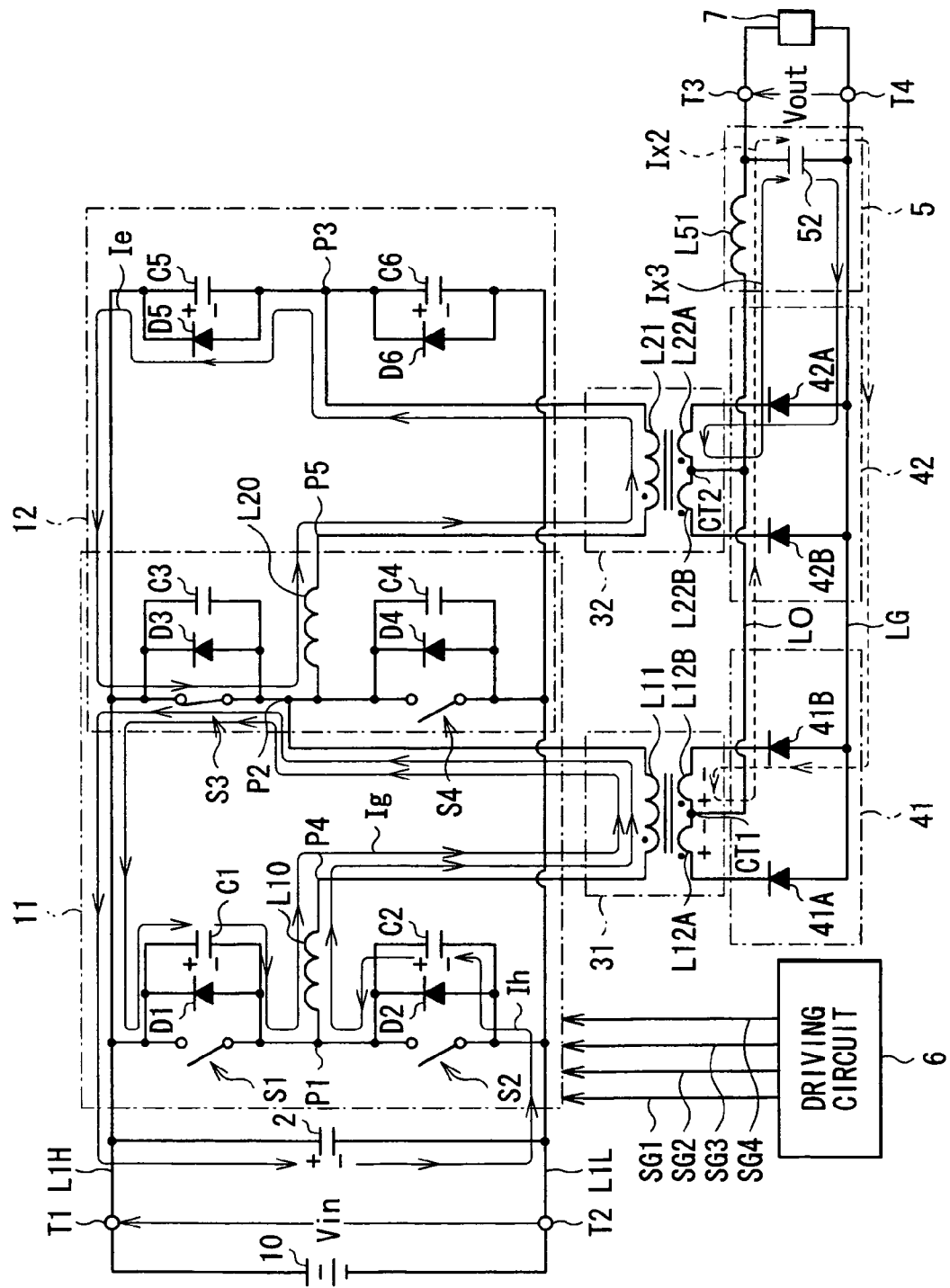
FIG. 6 is a circuit diagram illustrating operations of the switching power supply unit subsequent to FIG. 5.

In the period between the time t5 and the time t6 as shown in FIG. 6, the switching element S1 is turned off at the time t5 ((A) in FIG. 2). The capacitors C1 and C2, the inductor L10, and the choke coil L51 cooperate to construct an LC series resonance circuit (first resonance circuit), and the first resonance operation is performed. The loop currents Ig and Ih as shown in FIG. 6 flow, the capacitor C2 is discharged, and the capacitor C1 is charged. Consequently, the potential VP1 at the connection point P1 gradually drops and the potential VP1 becomes 0V at the time t6 ((E) in FIG. 2).

Figure 7:
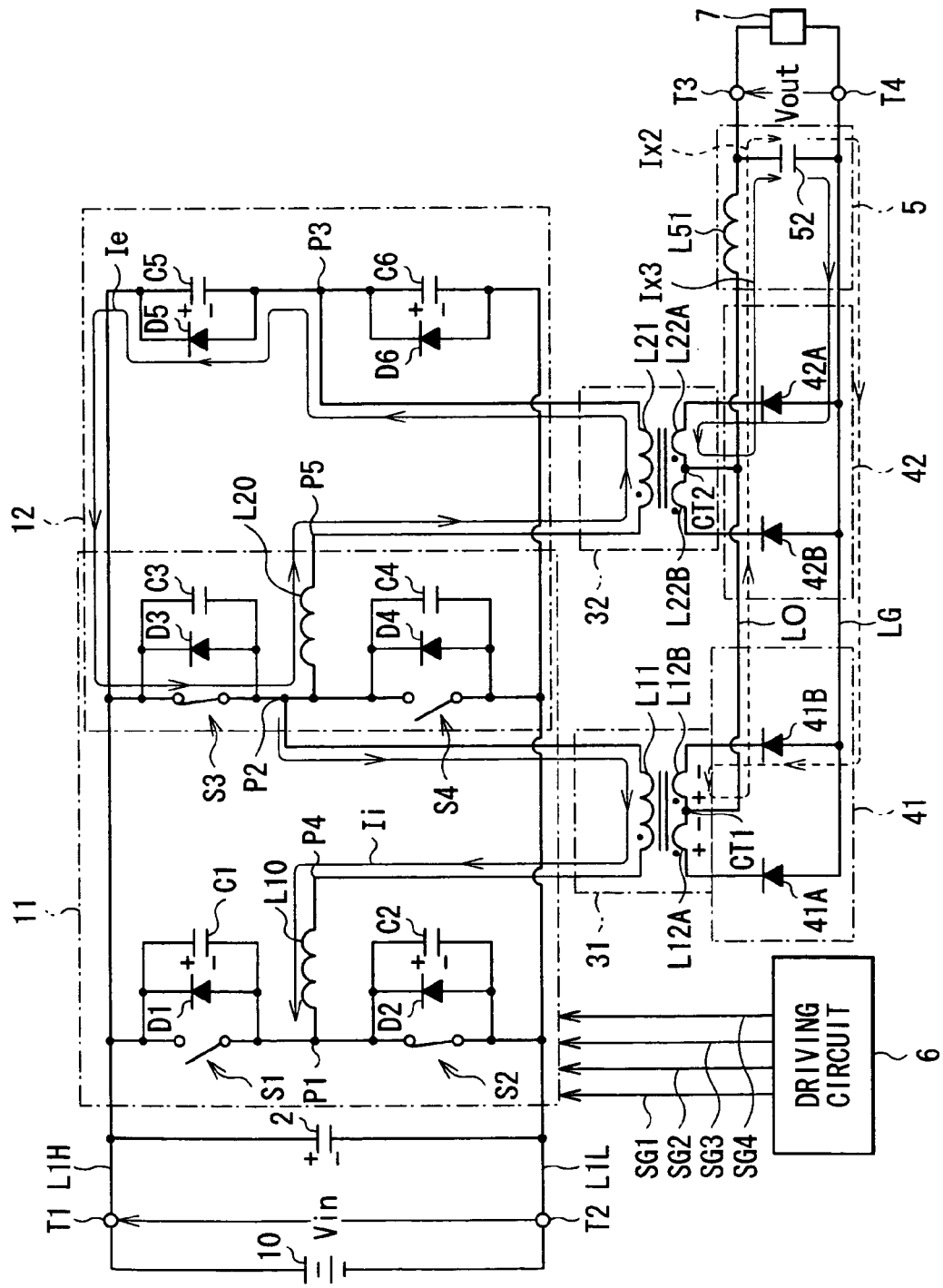
FIG. 7 is a circuit diagram illustrating operations of the switching power supply unit subsequent to FIG. 6.

In the period between the time t6 and the time t8 as shown in FIG. 7, the potential VP1 becomes 0V at the time t6 and, after that, the switching element S2 is turned on ((B) in FIG. 2), thereby performing ZVS operation. As a result, a short-circuit loss in the switching element S2 is suppressed. Since the input smoothing capacitor 2 is charged by the first resonance operation, the current I10 in the inductor L10 decreases. In association with the decrease, the current Ix2 flowing in the secondary-side winding L12B also decreases, and the current Ix3 flowing in the secondary-side winding L22A increases. The timing at which the current I10 in the inductor L10 becomes 0 A corresponds to the time t7, and Ix2 becomes equal to Ix3 (Ix2=Ix3). Since VP1=0V and VP2=Vin at this time ((E) and (F) in FIG. 2), the direction of current in the inductor L10 is inverted from the time t7, and the current Ii in the direction as shown in FIG. 7 flows. Further, when the current Ix2 decreases to 0 A, a voltage for setting "the potential VP4 at the connection point P4> the potential VP2 at the connection point P2" is generated across the primary-side winding L11 of the transformer 31, and power transmission from the primary side to the secondary side of the transformer 31 starts. This timing corresponds to the time t8.

Figure 8:
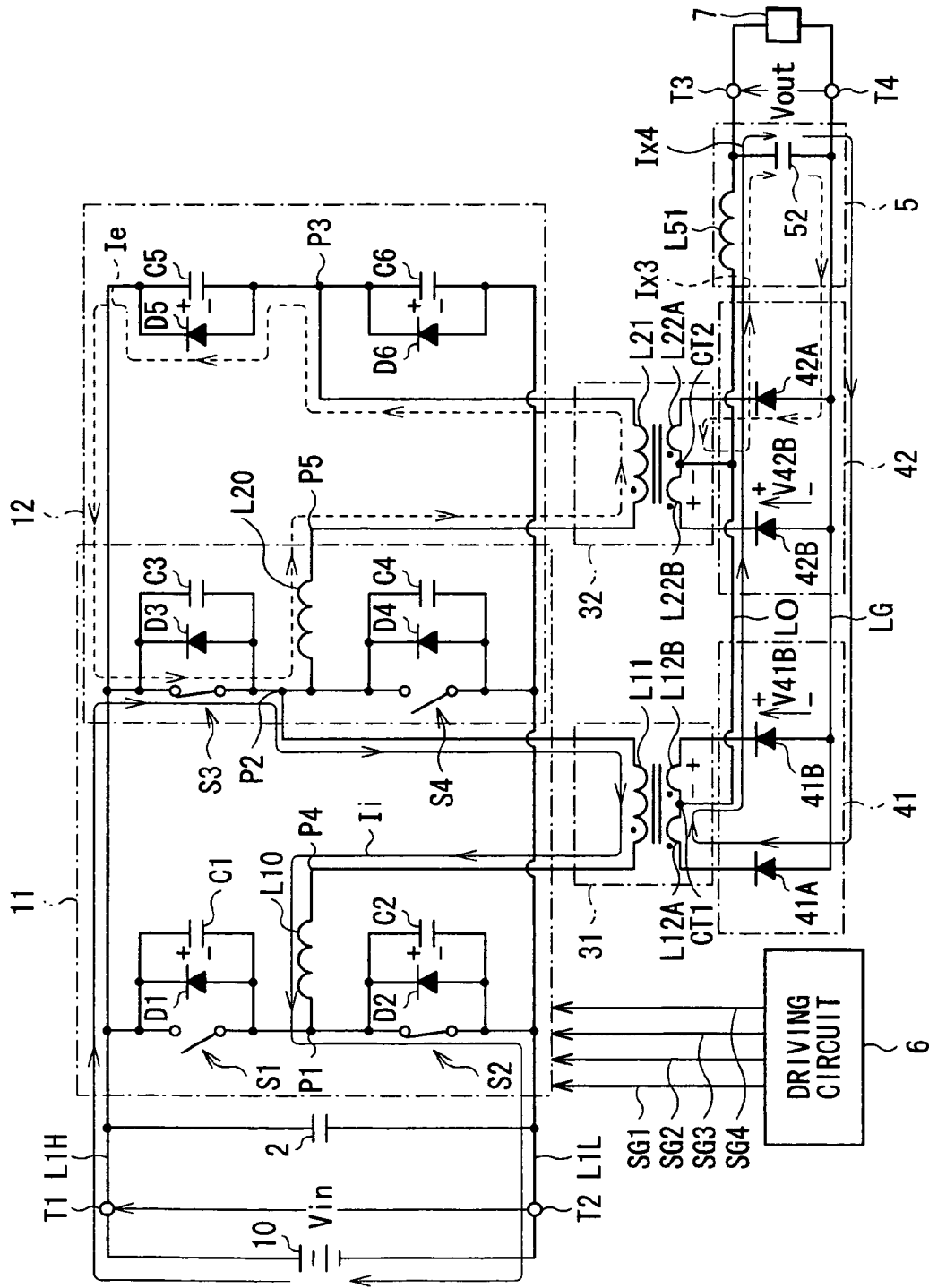
FIG. 8 is a circuit diagram illustrating operations of the switching power supply unit subsequent to FIG. 7.

In the period from the time t8 to the time t10 as shown in FIG. 8, the loop current Ij as shown in FIG. 8 flows in the first bridge circuit 11, the inductor L10 is excited and power is transmitted from the primary side to the secondary side of the transformer 31. Therefore, on the secondary side of the transformer 31, the loop current Ix4 flows via the rectifier diode 41A and the choke coil L51, and the load 7 is driven. From the time t8, the reverse voltages V41B and V42B start to be generated in the rectifier diodes 41B and 42B ((L) and (N) in FIG. 2).

The voltage V12A across the secondary-side winding L12A increases and the current Ix4 also increases. The voltage V12A is applied to the secondary-side winding L22B of the transformer 32, and the potential VP5 at the connection point P5 becomes higher than the potential VP3 at the connection point P3. Since VP2=VP3=Vin in the period ((F) and (G) in FIG. 2), −V20=V21 and VP2<VP5, and the voltage V10 which decreases the current I20 in the inductor L20 flowing from the connection point P2 to the connection point P5 is generated ((H) to (J) in FIG. 2). Therefore, as the current I20 decreases, the current I21 in the primary-side winding L21 of the transformer 32 also decreases, and the current Ix3 flowing in the secondary-side winding L22A also decreases. The choke coil L51 can be regarded as a constant current source and the reverse voltages V41B and V42B are applied to the rectifier diodes 41B and 42B, respectively ((L) and (N) in FIG. 2), so that the current Ix4 increases as the current Ix3 decreases. The timing at which the current flowing in the inductors L10 and L20, that is, the current in the direction of increasing the reverse voltages V41B and V42B accumulated by the first resonance operation and the current in the direction of suppressing the reverse voltages accumulated by the second resonance operation are balanced with opposite phases corresponds to the time t9.

In the period from the time t9 to the time t10, as described above, the current in the direction of amplifying the reverse voltages V41B and V42B accumulated by the first resonance operation and the current in the direction of suppressing the reverse voltages V41B and V42B accumulated by the second resonance operation are balanced with opposite phases. In other words, the energy in the direction of suppressing surge voltage is injected from the second bridge circuit 12 into the rectifier circuit 41. Therefore, the reverse voltages V41B and V42B in the rectifier diodes 41B and 42B become lower than voltages to be inherently applied and determined by the DC input voltage Vin and the primary-side and secondary-side windings of the transformer 31, and rise in the surge voltage is suppressed. In such a manner, as shown by (L) and (N) in FIG. 2, the reverse voltages V41B and V42B rise step by step, and rise in the surge voltage is suppressed.

Figure 9:
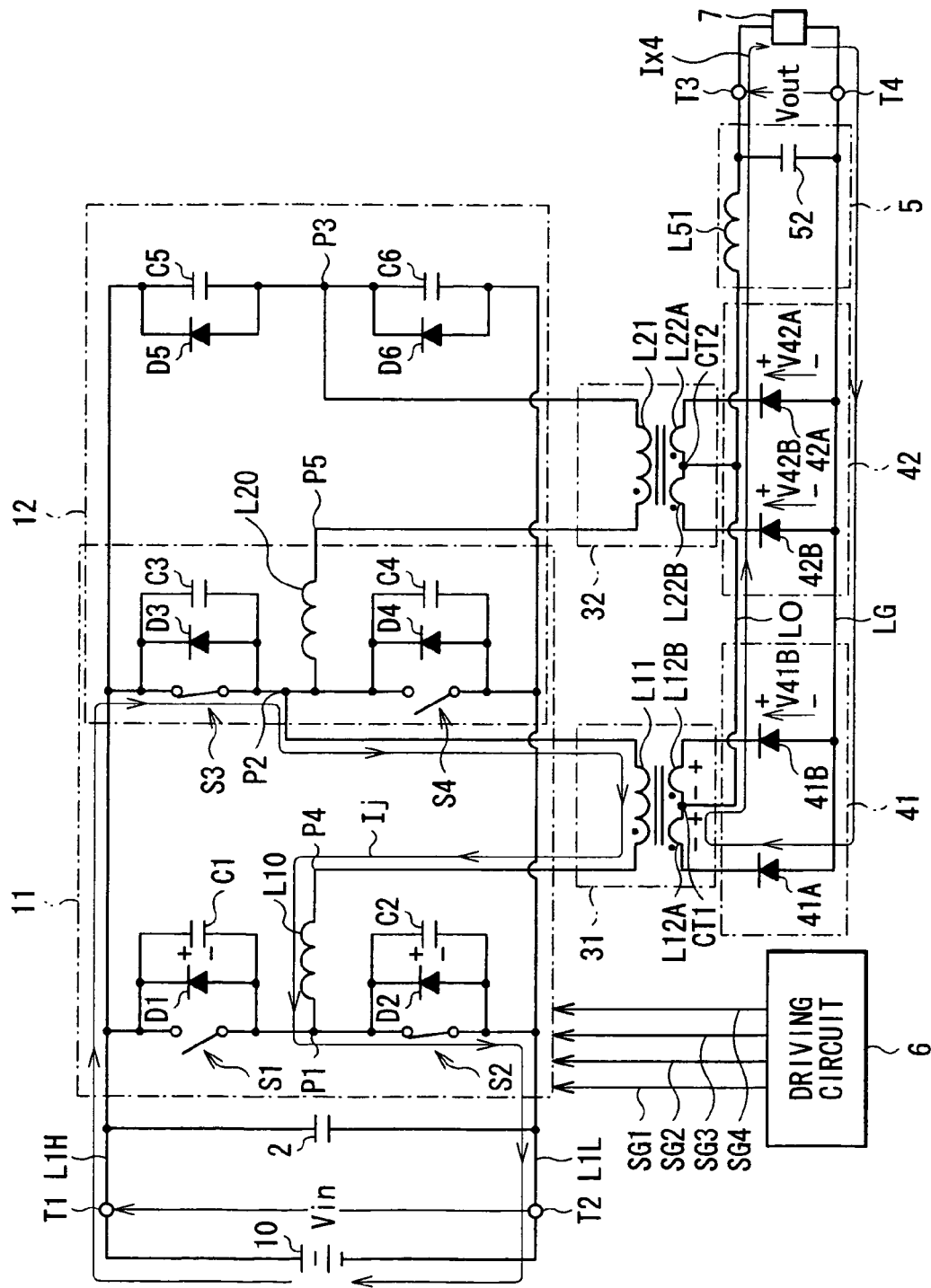
FIG. 9 is a circuit diagram illustrating operations of the switching power supply unit subsequent to FIG. 8.
Figure 10:
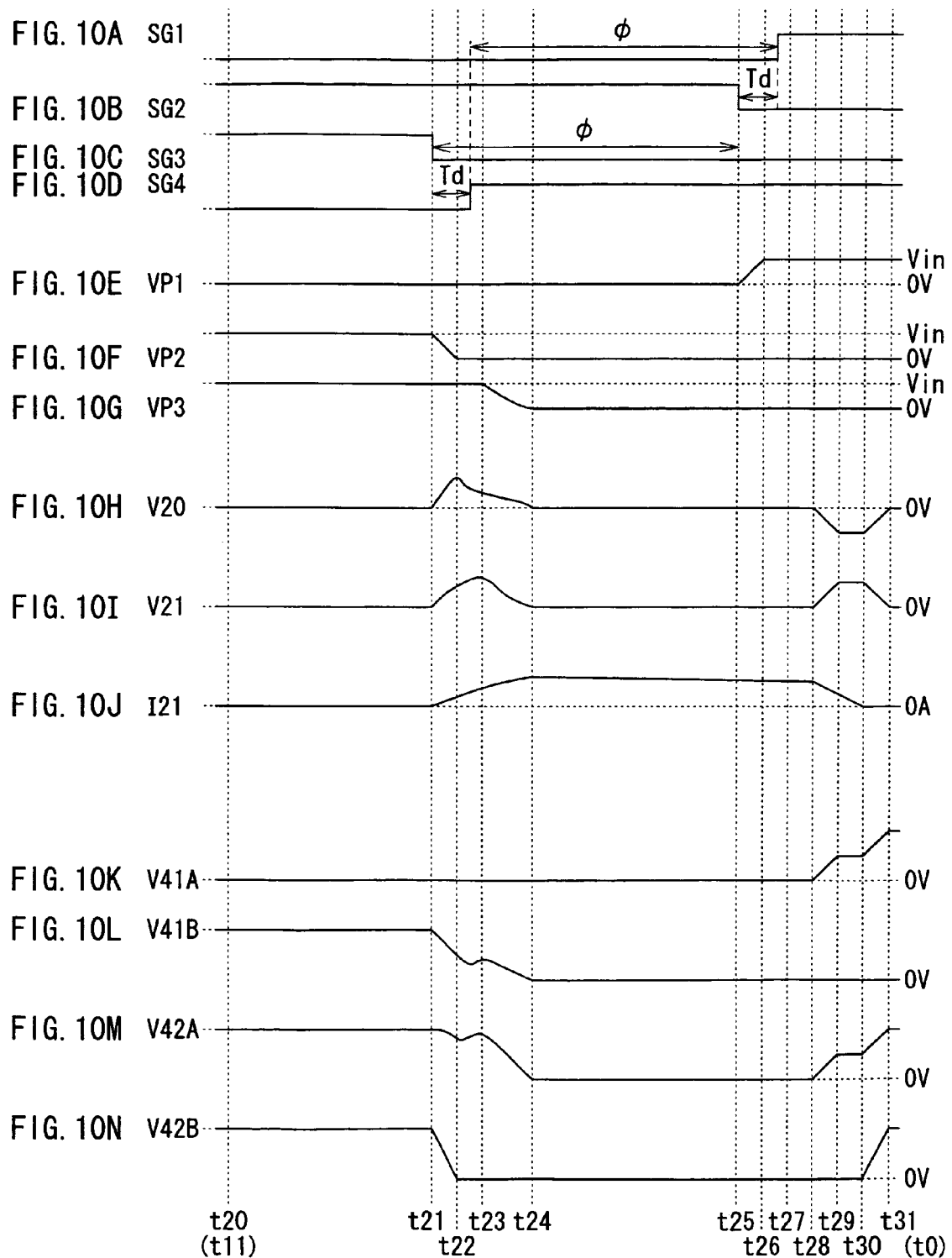
FIG. 10 is a timing waveform chart illustrating operations of the switching power supply unit subsequent to FIG. 9.

Finally, as shown in FIG. 9, in the period from the time t10 to the time t11, the current Ix3 becomes 0 A at the time t10, and the reverse voltages V41B and V42B to be applied to the rectifier diodes 41B and 42B also increase to voltages to be inherently applied and determined by the DC input voltage Vin and the primary-side and secondary-side windings of the transformer 31.

Referring now to FIG. 10, operations in the latter half cycle after the timings shown in FIG. 2 will be described.

The operations in the latter half cycle are basically similar to those in the first half cycle described with reference to FIGS. 2 to 9. Specifically, when the switching element S3 is turned off at the time t21 ((C) in FIG. 10), the capacitors C3 and C4, the inductor L10, and the choke coil L51 cooperate to construct the first resonance circuit, and first resonance operation is performed. The capacitor C4 is discharged and, on the other hand, the capacitor C3 is charged. Consequently, the potential VP2 at the connection point P2 gradually decreases and becomes equal to 0V (VP2=0V) at the time t22 ((F) in FIG. 10). By the resonance operation, the loop current flows also to the secondary side of the transformer 31, the reverse voltages V41B and V42A of the rectifier diodes 41B and 42A drop gradually, and the reverse voltage V42B of the rectifier diode 42B becomes 0V at the time t22 ((L) to (N) in FIG. 10).

In the period between the time t22 and the time t25, first, VP2 becomes 0V at the time t22 and, after that, the switching element S4 is turned on ((D) in FIG. 10), thereby performing the ZVS operation. As a result, a short-circuit loss in the switching element S4 is suppressed. At this instance, the loop current flows to the first bridge circuit 11 and V2P becomes smaller than VP3 (VP2<VP3), so that loop currents flow also into the second bridge circuit 12. The capacitor C5 is charged, the capacitor C6 is discharged, and the inductor L20 is excited. The capacitors C5 and C6 and the inductor L20 cooperate to construct a second resonance circuit, second resonance operation is performed, and the potential VP3 at the connection point P3 gradually decreases ((G) in FIG. 10). In association with the above, the voltage V20 across the inductor L20 and the voltage V21 across the primary-side winding L21 of the transformer 32 also gradually increase ((H) and (I) in FIG. 10), and voltage is generated also in the secondary-side windings L22A and L22B of the transformer 32. The timing at which the voltage V22B across the secondary-side winding L22B becomes equal to the potential VLO of the output line LO corresponds to the time t23.

At the time t23 and later, the voltage V22B across the secondary-side winding L22B becomes higher than the voltage V12A across the secondary-side winding L12B of the transformer 31, so that the voltage V22B across the secondary-side winding L22B is applied also to the secondary-side winding L12A. Accordingly, the potential VP4 at the connection point P4 becomes lower than the potential VP1 at the connection point P1. Since VP1=VP2=0V in this period ((E) and (F) in FIG. 10), V10=−V11 and VP4>VP2, and the voltage V10 in the direction of decreasing the current I10 in the inductor L10 flowing from the connection point P2 to the connection point P4 is generated. Therefore, due to decrease in the current I10, the current I11 in the primary-side winding L11 in the transformer 31 decreases, and the current flowing in the secondary-side winding L12B also decreases. In this case, the choke coil L51 can be regarded as a constant current source and the reverse voltages V41B and V42A are applied to the rectifier diodes 41B and 42A, respectively ((L) and (M) in FIG. 10), so that the current flowing in the secondary-side winding L22B increases as the current flowing in the secondary-side winding L12B decreases.

Since the potential VP3 at the connection point P3 gradually decreases as described above, the potential difference between the potential VP3 and the potential VP2 at the connection point P2 decreases. In association with the decrease, the voltage V21 across the primary-side winding L21 of the transformer 32 also decreases ((I) in FIG. 10), and the voltage V22B across the secondary-side winding L22B and the potential VLO of the output line LO also decrease. The timing when VP3 and VP2 become equal to 0V is satisfied (VP3=VP2=0V) corresponds to the time t24 ((G) in FIG. 10).

At the time t25, V20=V21=V22A=VLO=0V ((H) and (I) in FIG. 10), the diode D6 is made conductive, and currents are held. The period between the time t24 and the time t25 is a commutation period of current from the choke coil L51.

In the period between the time t25 and the time t26, the switching element S2 is turned off at the time t25 ((B) in FIG. 10). The capacitors C1 and C2, the inductor L10, and the choke coil L51 cooperate to construct a first resonance circuit, and the first resonance operation is performed. Therefore, the loop current flows in the first bridge circuit 11, the capacitor C2 is charged, and the capacitor C1 is discharged. Consequently, the potential VP1 at the connection point P1 gradually rises and the potential VP1 becomes Vin at the time t26 ((E) in FIG. 10).

In the period between the time t26 and the time t28, the potential VP1 becomes equal to Vin at the time t26 and, after that, the switching element S1 is turned on ((A) in FIG. 10), thereby performing ZVS operation. As a result, a short-circuit loss in the switching element S1 is suppressed. Since the input smoothing capacitor 2 is also charged by the first resonance operation, the current I10 in the inductor L10 decreases. In association with the decrease, the current flowing in the secondary-side winding L12A also decreases, and the current flowing in the secondary-side winding L22B increases. The timing at which the current I10 in the inductor L10 becomes 0 A corresponds to the time t27. Since VP1=Vin and VP2=V0 at this time ((E) and (F) in FIG. 10), the direction of current in the inductor L10 is inverted from the time t27. Further, when the current flowing in the secondary-side winding L12A decreases to 0 A, a voltage for setting "the potential VP4 at the connection point P4 <the potential VP2 at the connection point P2" is generated across the primary-side winding L11 of the transformer 31, and power transmission from the primary side to the secondary side of the transformer 31 starts. This timing corresponds to the time t28.

In the period from the time t28 to the time t30, the loop current flows in the first bridge circuit 11, the inductor L10 is excited, and power is transmitted from the primary side to the secondary side of the transformer 31. Therefore, on the secondary side of the transformer 31, the loop current flows via the rectifier diode 41B and the choke coil L51, and the load 7 is driven. From the time t28, the reverse voltages V41B and V42B start to be generated in the rectifier diodes 41B and 42B ((K) and (M) in FIG. 10).

The voltage V12B across the secondary-side winding L12B increases and the current flowing in the secondary-side winding L12B also increases. The voltage V12B is applied to the secondary-side winding L22A of the transformer 32, and the potential VP3 at the connection point P3 becomes higher than the potential VP5 at the connection point P5. Since VP2=VP3=0V in this period ((F) and (G) in FIG. 10), V20=−V21 and VP2>VP5, and the voltage V10 in the direction of decreasing the current I20 in the inductor L20 flowing from the connection point P5 to the connection point P2 is generated ((H) to (J) in FIG. 10). Therefore, as the current I20 decreases, the current I21 in the primary-side winding L21 of the transformer 32 also decreases, and the current flowing in the secondary-side winding L22B also decreases. The choke coil L51 can be regarded as a constant current source and the reverse voltages V41A and V42A are applied to the rectifier diodes 41A and 42A, respectively ((K) and (M) in FIG. 10), so that the current in the secondary-side winding L12B increases as the current flowing in the secondary-side winding L22B decreases. The timing at which the current flowing in the inductors L10 and L20, that is, the current in the direction of amplifying the reverse voltages V41A and V42A accumulated by the first resonance operation and the current in the direction of suppressing the reverse voltages accumulated by the second resonance operation are balanced with opposite phases corresponds to the time t29.

In the period from the time t29 to the time t30, as described above, the current in the direction of amplifying the reverse voltages V41A and V42A accumulated by the first resonance operation and the current in the direction of suppressing the reverse voltages accumulated by the second resonance operation are balanced with opposite phases. In other words, the energy in the direction of suppressing surge voltage is injected from the second bridge circuit 12 into the rectifier circuit 41. Therefore, the reverse voltages V41A and V42A in the rectifier diodes 41A and 42A become lower than voltages to be inherently applied and determined by the DC input voltage Vin and the primary-side and secondary-side windings of the transformer 31, and rise in the surge voltage is suppressed. In such a manner, as shown by (K) and (M) in FIG. 10, the reverse voltages V41A and V42A rise step by step, and rise in the surge voltage is suppressed.

Finally, in the period from the time t30 to the time t31 (t0), the current flowing in the secondary-side winding L22B becomes 0 A at the time t30, and the reverse voltages V41A and V42A to be applied to the rectifier diodes 41A and 42A also increase to voltages to be inherently applied and determined by the DC input voltage Vin and the primary-side and secondary-side windings of the transformer 31. The resultant state is equivalent to the state at the time t0 in FIG. 2.

As described above, in the embodiment, the energy in the direction of suppressing the reverse voltages (surge voltages) V41A and V41B applied to the rectifier diodes 41A and 41B is injected into the rectifier circuit 41. Consequently, the reverse voltages applied to the rectifier diodes 41A and 41B can be made lower than the voltages to be inherently applied for a certain period, and rise in the surge voltage can be suppressed. Therefore, a loss in the rectifier device can be reduced and efficiency of the power supply unit can be improved. By reducing the loss in the rectifier device, heat generation in the device can be also suppressed. By suppressing the rise in the surge voltage, a rectifier device (rectifier diode) having a low withstand voltage can be used, so that the cost of parts can be also reduced. In the switching power supply unit of the embodiment, the shift-side switching elements in the bridge circuits 11 and 12 are commonly used. Therefore, as compared with the case of a second embodiment to be described next, the number of parts is smaller.

Figure 11:
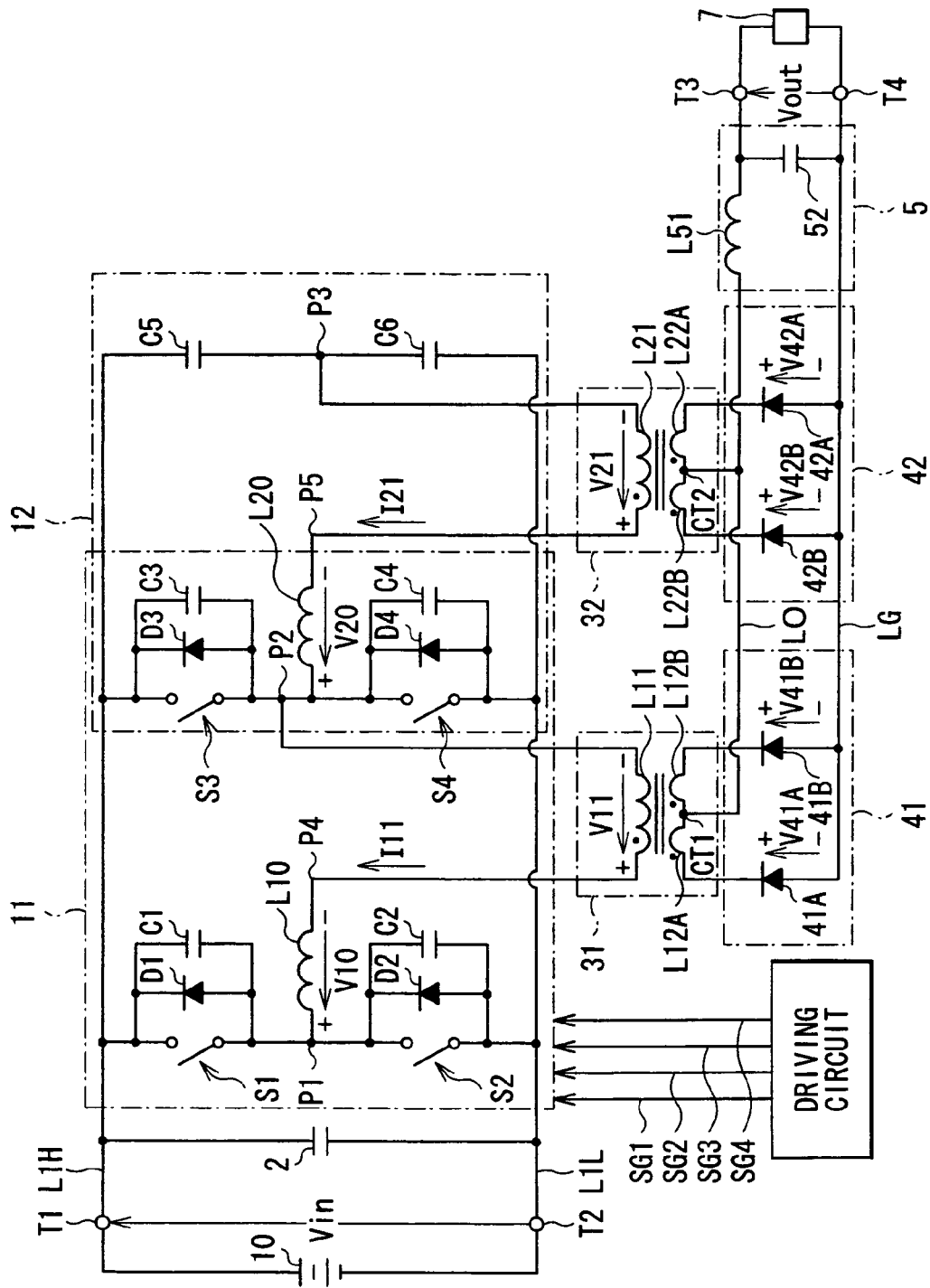
FIG. 11 is a circuit diagram showing the configuration of a switching power supply unit according to a modification of the first embodiment.

The switching power supply unit of the first embodiment has been described with respect to the case where the second bridge circuit 12 includes the pair of capacitors C5 and C6 connected in series and the diodes D5 and D6 connected in parallel with the capacitors C5 and C6, respectively. For example, as shown in FIG. 11, a configuration such that the second bridge circuit 12 does not include the diodes D5 and D6 may be also employed. With such a configuration, the effects can be obtained without providing the diodes D5 and D6 and the circuit configuration can be simplified. However, different from the case of the embodiment, the current flowing to the capacitors C5 and C6 in the direction from the connection point P3 to the primary-side high-voltage line L1H or in the direction from the primary-side-low-voltage line L1L to the connection point P3 cannot be passed to the paths of the diodes D5 and D6. Consequently, ringing occurs in (G) VP3, (H) V20, (I) V21, (K) V41A, (L) V41B, (M) V42A, and (K) V42B in FIGS. 2 and 10.

Figure 12:
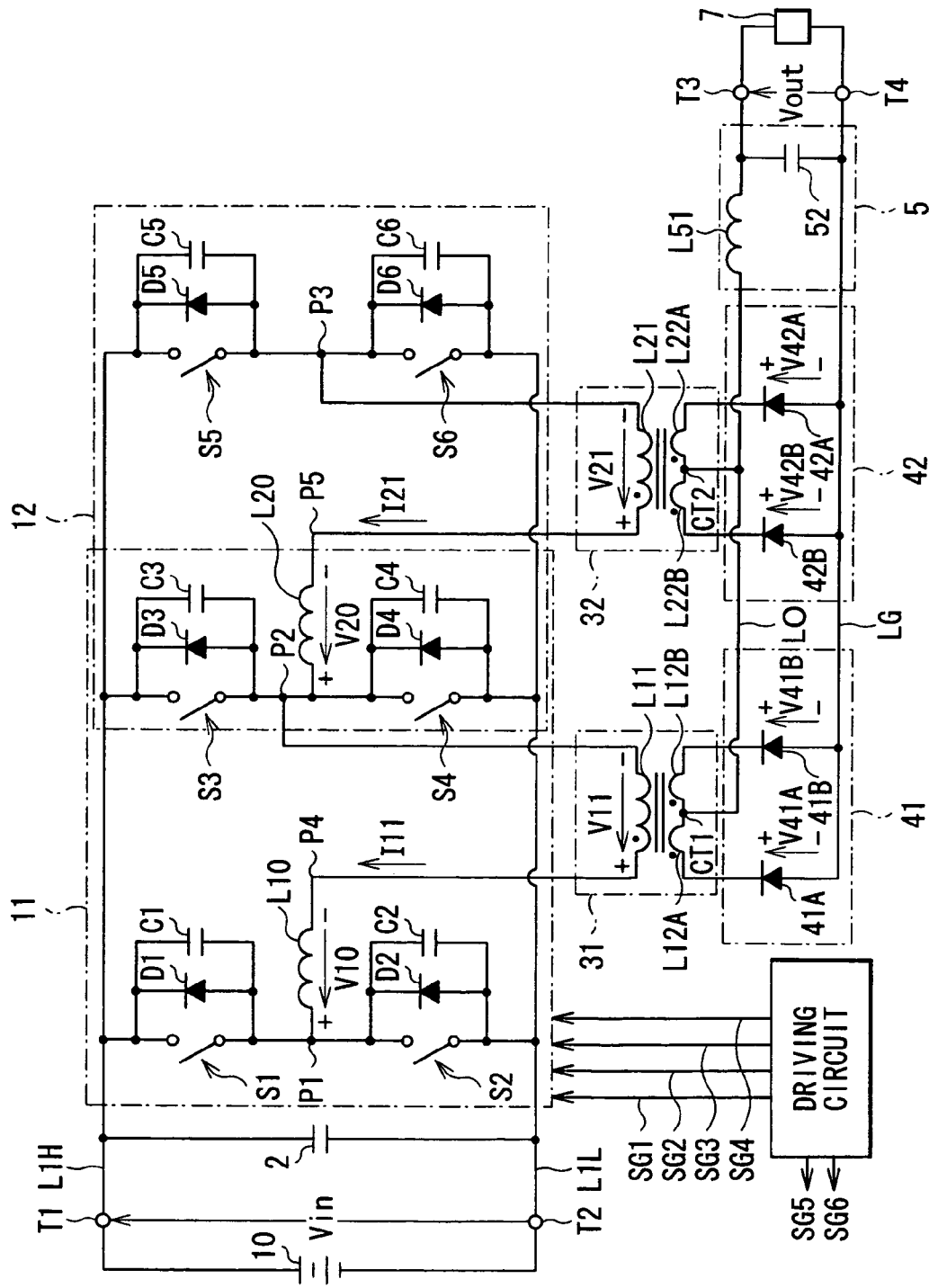
FIG. 12 is a circuit diagram showing the configuration of a switching power supply unit according to a modification of the first embodiment.

For example, as shown in FIG. 12, switching elements S5 and S6 may be further connected in parallel with the capacitors C5 and C6 and the diodes D5 and D6, respectively, in the configuration of FIG. 1. In this case, when the switching elements take the form of MOS-FETs, the capacitors C5 and C6 and the diodes D5 and D6 can be constructed by parasitic capacitances and parasitic diodes in the MOS-FETs. Therefore, it is unnecessary to provide the capacitors C5 and C6 and the diodes D5 and D6 in addition to the switching elements, so that the circuit configuration can be simplified.

Second Embodiment

A second embodiment of the invention will now be described.

In the first embodiment, the switching power supply unit in which the bridge circuits 11 and 12 are partially made common has been described. In the second embodiment, a switching power supply unit in which the bridge circuits 11 and 12 are constructed independently of each other will be described.

Figure 13:
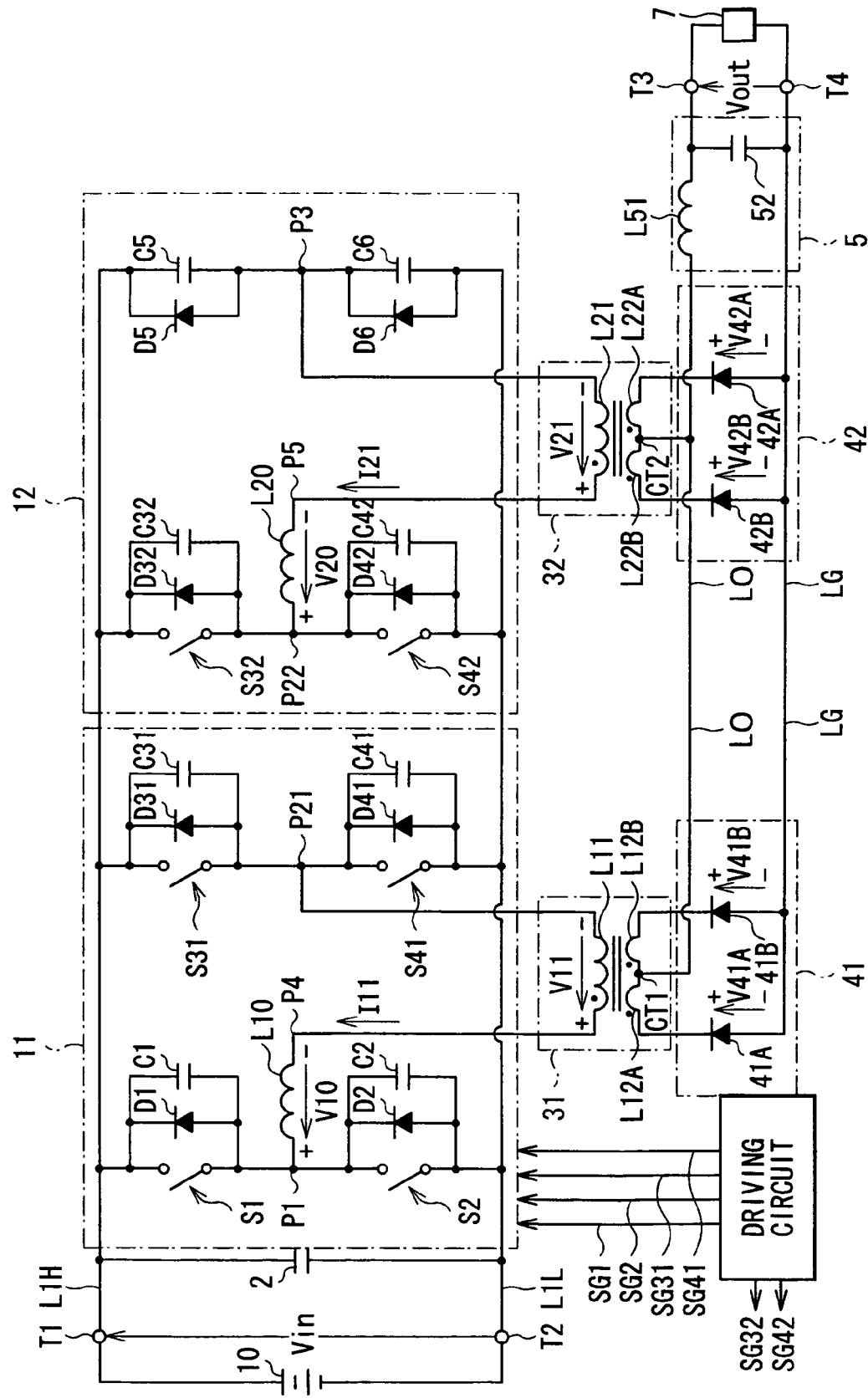
FIG. 13 is a circuit diagram showing the configuration of a switching power supply unit according to a second embodiment of the invention.

FIG. 13 shows the configuration of the switching power supply unit according to the second embodiment. In FIG. 13, the same reference numerals are designated to the same components as those shown in FIG. 1 and their description will not be repeated. The switching power supply unit has two bridge circuits (the first and second bridge circuits 11 and 12) which are independent of each other. The configuration of the other part is similar to that in the case of FIG. 1.

Concretely, the first bridge circuit 11 has four switching elements S1, S2, S31, and S41 and capacitors C1, C2, C31, and C41 and diodes D1, D2, D31, and D41 connected in parallel with the switching elements S1, S2, S31, and S41, respectively, thereby obtaining a full-bridge circuit configuration.

The second bridge circuit 12 is connected in parallel with the first bridge circuit 11 and has a pair of switching elements S32 and S42 connected in series, capacitors C32 and C42 and diodes D32 and D42 connected in parallel with the switching elements S32 and S42, respectively, a pair of capacitors C5 and C6 connected in series, and diodes D5 and D6 connected in parallel with the capacitors C5 and C6, respectively.

With such a configuration, in the switching power supply unit of the embodiment, by drive signals SG1, SG2, SG31, SG41, SG32, and SG42 from the driving circuit 6, the switching element S31 in the first bridge circuit 11 and the switching element S32 in the second bridge circuit 12 are turned on/off at the same timings, and the switching element S41 in the first bridge circuit 11 and the switching element S42 in the second bridge circuit 12 are turned on/off at the same timings. As a result, operations similar to those of the first embodiment (FIGS. 2 to 10) are performed. Therefore, by injecting energy in the direction of suppressing the surge voltage in the rectifier diodes 41A and 41B from the second bridge circuit 12 into the rectifier circuit 41, the reverse voltages to be applied to the rectifier diodes become lower than the voltage to be inherently applied and determined by the DC input voltage Vin and the primary and secondary sides of the transformer 31 for a certain period. As a result, rise in the surge voltage is suppressed.

The switching power supply unit of the second embodiment can also produce effects similar to those of the first embodiment. Specifically, by injecting the energy in the direction of suppressing the reverse voltages (surge voltages) V41A and V41B applied to the rectifier diodes 41A and 41B into the rectifier circuit 41, the reverse voltages applied to the rectifier diodes 41A and 41B can be made lower than the voltages to be inherently applied for a certain period, and rise in the surge voltage can be suppressed. Therefore, a loss in the rectifier device can be reduced and efficiency of the power supply unit can be improved. By reducing the loss in the rectifier device, heat generation in the device can be also suppressed. By suppressing the rise in the surge voltage, a rectifier device (rectifier diode) having a low withstand voltage can be used, so that the cost of parts can be also reduced.

The switching power supply unit of the second embodiment can also use MOS-FETs as the switching elements S31, S32, S41, and S42. In this case, the capacitors C31, C32, C41, and C42 and the diodes D31, D32, D41, and D42 can be constructed by parasitic capacitances and parasitic diodes in the MOS-FETs.

The switching power supply unit of the second embodiment may have a configuration such that the second bridge circuit 12 does not include the diodes D5 and D6 as shown in FIGS. 11 and 12, or the switching elements S5 and S6 may be further connected in parallel with the capacitors C5 and C6 and the diodes D5 and D6, respectively. In the case where the switching elements S5 and S6 are further connected in parallel and the first and second bridge circuits 11 and 12 have similar circuit configurations, the second bridge circuit 12 also can perform the switching operation, and the DC output voltage Vout can be supplied at a voltage conversion ratio different from that in the case where the first bridge circuit 11 performs the switching operation. Therefore, by selectively operating the first and second bridge circuits 11 and 12 in accordance with the magnitude of the DC input voltage Vin from the high-voltage battery 10, the range of the DC input voltage Vin by which a target DC output voltage Vout can be supplied can be widened. Thus, the switching power supply unit having a wide input voltage range in addition to the effects of the foregoing embodiment can be configured.

Third Embodiment

A third embodiment of the present invention will now be described.

Although the switching power supply unit having the configuration in which the shift-side switching elements (the switching elements S31, S41, S32, and S42 shown in FIG. 13) in the bridge circuits 11 and 12 are commonly used has been described in the first embodiment, in the third embodiment, a switching power supply unit having a configuration in which fixed-side switching elements in the bridge circuits 11 and 12 are commonly used will be described.

Figure 14:
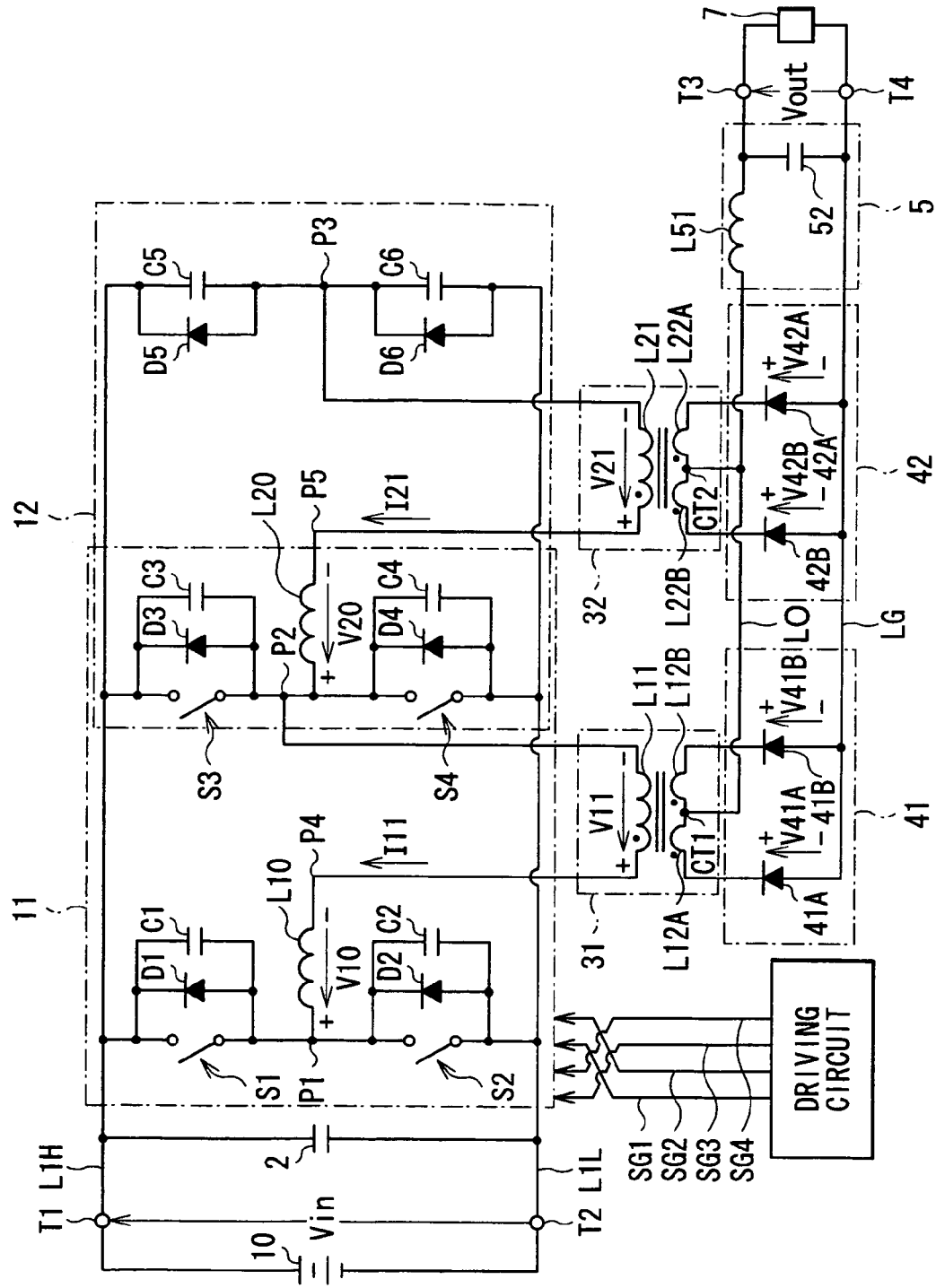
FIG. 14 is a circuit diagram showing the configuration of a switching power supply unit according to a third embodiment of the invention.

FIG. 14 shows the configuration of the switching power supply unit according to the third embodiment. In the diagram, the same reference numerals are designated to the same components as those shown in FIG. 1 and their description will not be repeated. As described above, the switching power supply unit includes the bridge circuits 11 and 12 having a configuration in which the fixed-side switching elements (the switching elements S3 and S4) in the bridge circuits 11 and 12 are commonly used. Specifically, in the switching power supply unit shown in FIG. 14, in a manner opposite to the case of FIG. 1, the switching elements S3 and S4 are fixed-side switching elements, and the switching elements S1 and S2 are shift-side switching elements. Concretely, as shown in FIG. 14, by supplying the switching signals SG1, SG2, SG3, and SG4 to the switching elements S3, S4, S1, and S2, respectively, the fixed-side switching elements and the shift-side switching elements in FIG. 1 change places. The configuration of the other part is similar to that in the case of FIG. 1.

Figure 15:
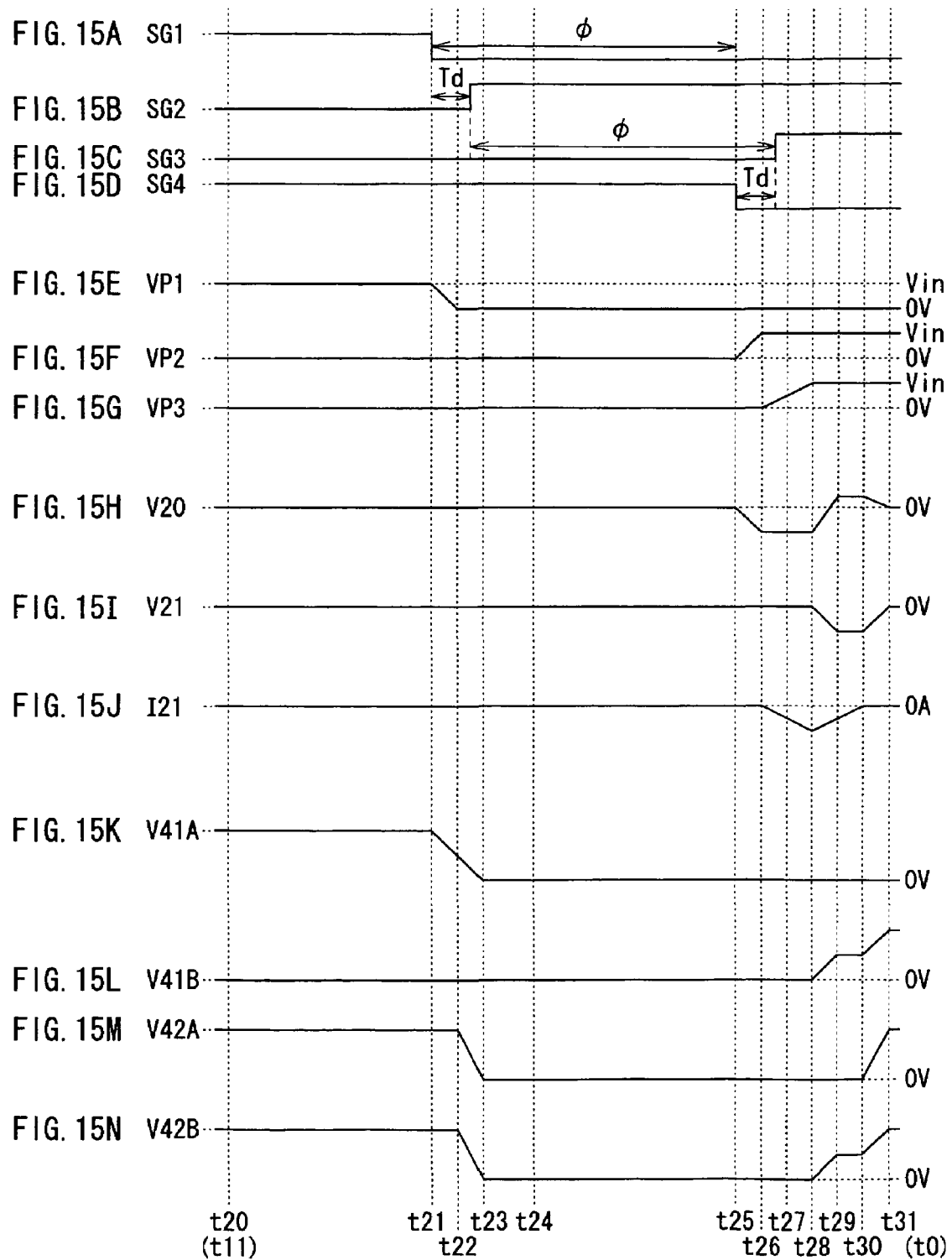
FIG. 15 is a timing waveform chart illustrating operations of the switching power supply unit of FIG. 14.

FIG. 15 is a timing waveform chart showing voltage waveforms of components in the switching power supply unit of FIG. 14 (at timings t11 to t21 (t0)), and corresponds to FIG. 10 in the first embodiment (the switching power supply unit of FIG. 1).

As described above, it is understood from comparison between the voltage waves of FIG. 15 with those of FIG. 10 that the switching signals SG1 and SG2 change places with the switching signals SG3 and SG4 in the switching power supply unit of the third embodiment ((A) to (D) in FIG. 15).

In the voltage waveforms shown in FIG. 10, the period in which the current I21 flows across the primary-side winding L21 is the period from the time t21 to the time t30 ((J) in FIG. 10). In the voltage waveform shown in FIG. 15, the period is the period from the time t26 to the time t30 ((J) in FIG. 15). That is, in the switching power supply unit of the third embodiment, as compared with the case of FIG. 1, the period in which the current I21 flows across the primary-side winding L21 is shorter. Therefore, the duty ratio of current flowing in the diodes D5 and D6 in the bridge circuit 12 becomes low, and average current per cycle is small, so that a conduction loss in the diodes D5 and D6 is reduced. The positive and negative signs of the current I21 shown in (J) of FIG. 15 are reversal of those of the current I21 shown in (J) of FIG. 10 for the reason that the direction of the current I21 is reversed due to the interchange between the fixed-side switching elements and the shift-side switching elements.

Further, since the period in which the current I21 flows across the primary-side winding L21 is shorter than that in the case of FIG. 1, the period in which current flows in the secondary-side windings L22A and L22B and the rectifier diodes 42A and 42B in the transformer 32 becomes shorter. Therefore, the duty ratio of the currents flowing in the rectifier diodes 42A and 42B becomes low, and the average current per cycle also becomes smaller. Consequently, as compared with the case of FIG. 1, a conduction loss is reduced also in the rectifier diodes 42A and 42B.

As described above, in the switching power supply unit of the embodiment, by decreasing the duty ratio of the currents flowing in the diodes D5 and D6 in the bridge circuit 12 and the rectifier diodes 42A and 42B in the rectifier circuit 42, the conduction loss in the devices is reduced. Consequently, in addition to the effects in the first embodiment, the efficiency of the power supply unit can be further improved. By reducing the conduction loss in the devices, heat generation in the devices can be also suppressed and, further, the cost of the parts can be also reduced.

The switching power supply unit of the third embodiment may have a configuration such that the second bridge circuit 12 does not include the diodes D5 and D6 as shown in FIG. 11 or a configuration such that the switching elements S5 and S6 are further connected in parallel with the capacitors C5 and C6 and the diodes D5 and D6, respectively, as shown in FIG. 12.

Fourth Embodiment

A fourth embodiment of the invention will now be described.

Although the switching power supply units in each of which the two transformers 31 and 32 are constructed by separate magnetic devices have been described in the first to third embodiments, in the fourth embodiment, a switching power supply unit in which the transformers 31 and 32 are constructed by a single magnetic device will be described.

Figure 16:
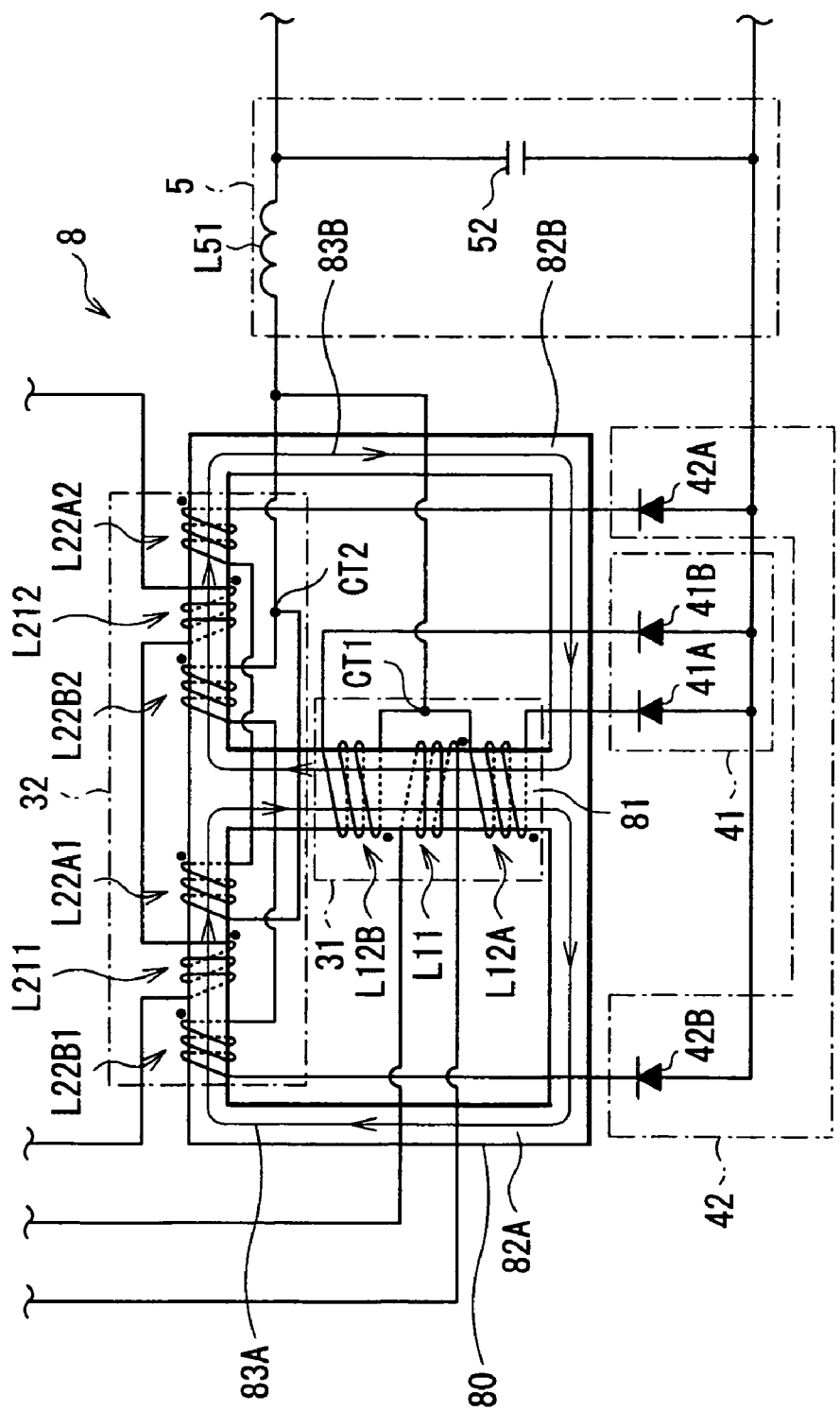
FIG. 16 is a circuit diagram showing the configuration of a switching power supply unit according to a fourth embodiment of the invention.

FIG. 16 shows the configuration of a portion including the transformers 31 and 32, the rectifier circuits 41 and 42, and the smoothing circuit 5 in the switching power supply unit according to the fourth embodiment. In the diagram, the same reference numerals are designated to the same components as those shown in FIG. 1 and their description will not be repeated.

In the switching power supply unit of the fourth embodiment, the transformers 31 and 32 are constructed by a single magnetic device 8. Concretely, the magnetic device 8 has a magnetic core 80, the primary-side winding L11 and the secondary-side windings L12A and L12B of the transformer 31 as center leg coils, the primary-side winding L211 and the secondary-side windings L22A1 and L22B1 of the transformer 32 as first outer leg coils, and the primary-side winding L212 and the secondary-side windings L22A2 and L22B2 of the transformer 32 as second outer leg coils. The configuration of the other part is similar to that in the case of FIG. 1.

The magnetic core 80 has the center leg part 81, a first outer leg part 82A constructing a first loop magnetic path in cooperation with the center leg part 81 while sharing the center leg part 81, and a second outer leg part 82B constructing a second loop magnetic path in cooperation with the center leg part 81 while sharing the center leg part 81. The first and second outer leg parts 82A and 82B are made of the same material and made in the same shape and the same size.

A center leg coil (the primary-side winding L11 and the secondary-side windings L12A and L12B of the transformer 31) is wound around the center leg part 81 of the magnetic core 80. The center leg coil is constructed by the primary-side winding L11 as an input center leg coil and the secondary-side windings L12A and L12B as output center leg coils. With such a configuration, the center leg coil functions as the transformer 31.

The first outer leg coil (the primary-side winding L211 and the secondary-side windings L22A1 and L22B1 of the transformer 32) and the second outer leg coil (the primary-side winding L212 and the secondary-side windings L22A2 and L22B2 of the transformer 32) continuously wind from the first outer leg part 82A to the second outer leg part 82B of the magnet core 80. The first outer leg coil is constructed by the primary-side winding L211 as a first input outer leg coil and the secondary-side windings L22A1 and L22B1 as first output outer leg coils. The second outer leg coil is constructed by the primary-side winding L212 as a second input outer leg coil and the secondary-side windings L22A2 and L22B2 as second output outer leg coils. With such a configuration, the first and second outer leg coils function as a single transformer 32.

In the first and second outer leg coils, the first outer leg coil winds around the first outer leg part 82A of a first loop magnetic path 83A, and the second outer leg coil winds around the first outer leg part 82A of a second loop magnetic path 83B. The number of turns of the first outer leg coil and that of the second outer leg coil are equal to each other, the winding direction of the primary-side winding L211 as the first input outer leg coil and that of the primary-side winding L212 as the second input outer leg coil are the direction of the same polarity, and the winding direction of the secondary-side windings L22A1 and L22B1 as the first output outer leg coils and that of the secondary-side windings L22A2 and L22B2 as the second output outer leg coils are the direction of the same polarity. The same polarity denotes that the directions of magnetic fluxes generated in the first and second outer leg parts 82A and 82B by currents flowing in the first and second outer leg coils are the same.

In the magnetic device 8 of the embodiment, the first and second outer leg parts 82A and 82B are made of the same material and made in the same shape and the same size, and the number of turns and the winding direction of the first outer leg coil and those of the second outer leg coil are the same. Consequently, the physical properties (hereinbelow, called first physical properties) of the first outer leg coil and the first outer leg part 82A around which the first outer leg coil part is wound and the physical properties (hereinbelow, called second physical properties) of the second outer leg coil and the second outer leg part 82B around which the second outer leg coil part is wound are the same in relation with the center leg coil.

The configuration in which the first and second physical properties are "the same" in relation with the center leg coil is not limited to the above configuration. The materials, shapes, sizes, and the like of the first and second outer leg parts 82A and 82B may be different from each other. In the case of such a configuration, the number of turns of each of the first and second outer leg coils has to be properly adjusted.

As long as the first and second physical properties are the same in relation with the center leg coil, the winding direction of the first outer leg coil and that of the second outer leg coil may be different from each other, or the winding position of the first outer leg coil and that of the second outer leg coil may not be line symmetrical with each other with respect to the center axis of the extension direction of the center leg coil as a reference.

Figure 17:
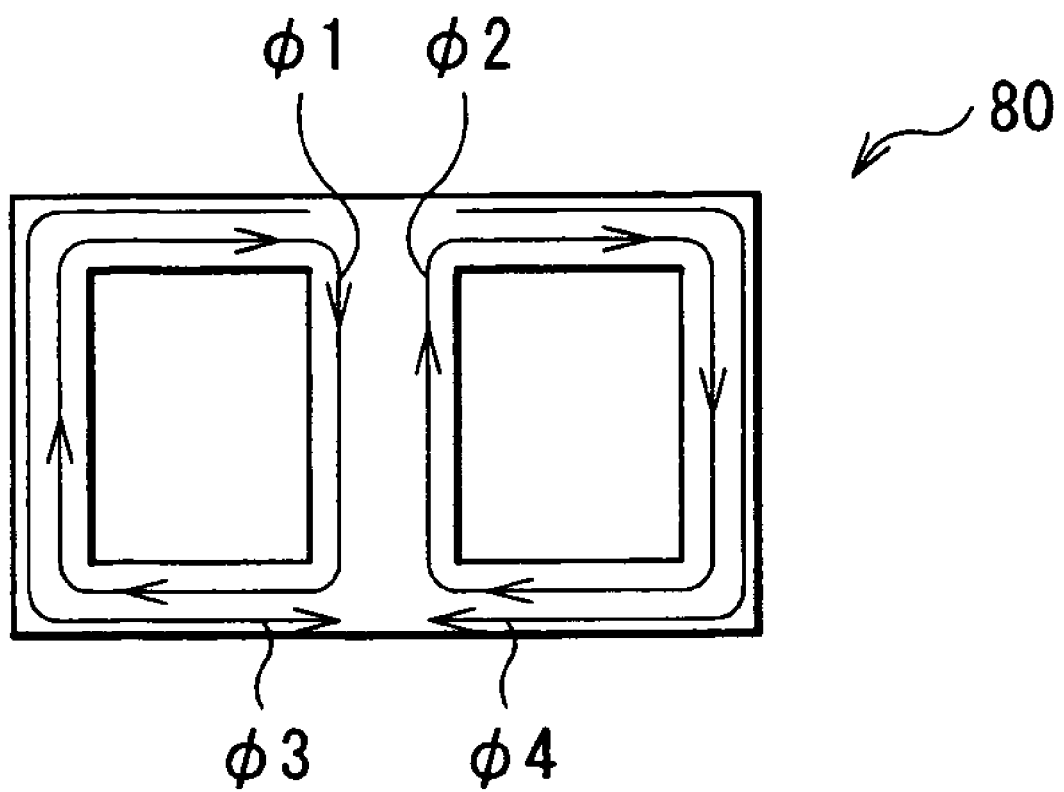
FIG. 17 is a conceptual diagram showing the flows of magnetic fluxes in a magnetic device in FIG. 16.

With the configuration, as shown in FIG. 17, a magnetic flux $\phi 1$ generated in the first outer leg part 82A by the current flowing in the first outer leg coil and a magnetic flux $\phi 2$ generated in the second outer leg part 82B by the current flowing in the second outer leg coil cancel out each other in the center leg part 81. Consequently, voltage is not substantially induced from the first and second outer leg coils to the center leg coil. On the other hand, magnetic fluxes $\phi 3$ and $\phi 4$ generated by the current flowing in the center leg coil in the loop magnetic paths constructed by the first and second outer leg parts 82A and 82B also cancel out each other in the loop magnetic paths, so that voltage is not substantially induced from the center leg coil to the first or second outer leg coil. Therefore, irrespective of the fact that the center leg coil and the outer leg coil are wound around the common magnetic coil 80, the center leg coil and the outer leg coil do not exert influence on each other. Thus, the transformers 31 and 32 can be constructed by the single magnetic device 8.

As described above, the switching power supply unit of the fourth embodiment is constructed so that the center leg coil as a component of the transformer 31 and the external leg coil as a component of the transformer 32 do not exert an influence on each other. Thus, the transformers 31 and 32 can be constructed by the single magnetic device 8 and can be commonly used. Therefore, the number of magnetic cores and the space occupied by the magnetic cores can be reduced. In addition to the effects of the first embodiment, the number of parts and the occupied area can be reduced.

Also in the switching power supply unit of the fourth embodiment, a parasitic diode of a MOS-FET may be used as each of the rectifier diodes 41A, 41B, 42A, and 42B.

Although the present invention has been described above by the first to fourth embodiments, the invention is not limited to the embodiments but can be variously modified.

Figure 18A:
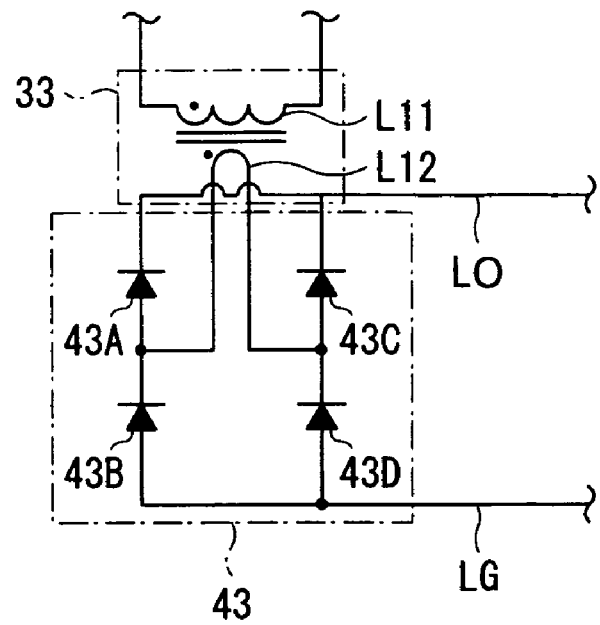
FIGS. 18A and 18B are circuit diagrams showing the configuration of a rectifier circuit according to a modification of the invention.
Figure 18B:
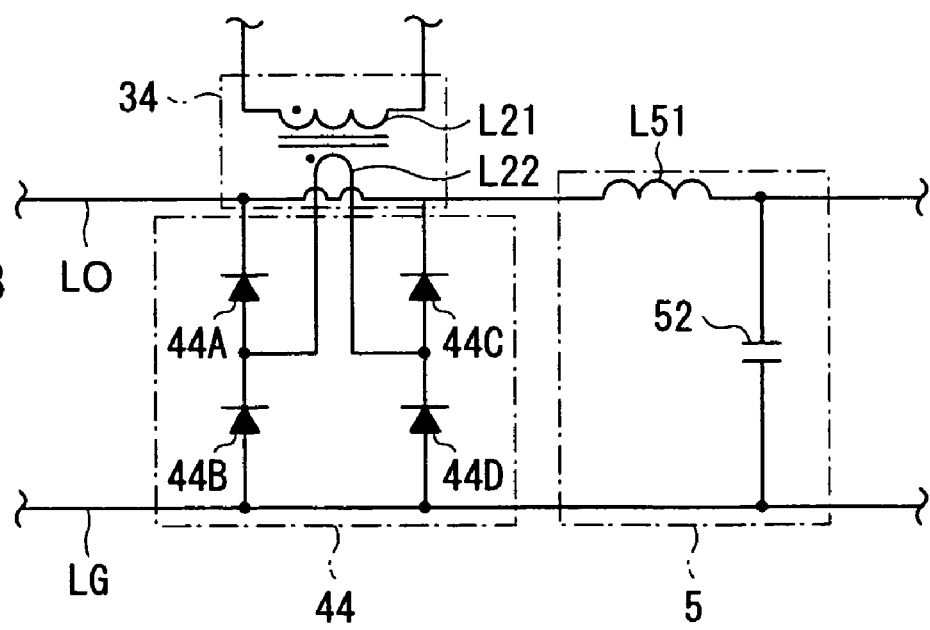

For example, the concrete circuit configurations of the switching power supply unit have been described in the foregoing embodiments, but the invention is not limited to the circuit configurations. For example, as shown in FIGS. 18A and 18B, at least one of the rectifier circuits 41 and 42 of the center tap type may be replaced with rectifier circuits 43 and 44 of a full bridge type. Concretely, in place of the transformers 31 and 32 in FIG. 1, a transformer 33 having one secondary-side winding L12 and a transformer 34 having one secondary-side winding L21 are provided. On the secondary side of the transformers 33 and 34, a rectifier circuit 43 of the full bridge type having four rectifier diodes 43A to 43D and a rectifier circuit 44 of the full bridge type having four rectifier diodes 44A to 44D are provided. Also in the case of such a configuration, effects similar to those of the embodiment can be obtained. Like the rectifier diodes 41A, 41B, 42A, and 42B, parasitic diodes of MOS-FETs can be used as the rectifier diodes 43A to 43D and 44A to 44D.

Obviously many modifications and variations of the present invention are possible in the light of the above teachings. It is therefore to be understood that within the scope of the appended claims the invention may be practiced otherwise than as specifically described.

What is claimed is:

1. A switching power supply unit comprising:
a first bridge circuit of a full bridge type including four first switching elements and generating a first AC voltage on the basis of a DC input voltage that is input to the switching power supply unit;
first capacitative elements each of which is connected in parallel with each of the first switching elements;
a first inductor connected to the first bridge circuit so as to form an H bridge and configuring a first resonance circuit in cooperation with the first capacitative elements;
a first transformer for transforming the first AC voltage to generate a second AC voltage;
a rectifier circuit provided on a secondary side of the first transformer, including a plurality of first rectifier elements, and rectifying the second AC voltage by the plurality of first rectifier elements, thereby generating a DC output voltage that is output from the switching power supply unit;
a pair of second capacitative elements connected in series, the pair of second capacitative elements connected in parallel with the first bridge circuit and configuring a second bridge circuit in cooperation with two switching elements connected in series, the two switching elements included in the four first switching elements;
a second inductor connected to the second bridge circuit so as to form an H bridge and configuring a second resonance circuit in cooperation with the second capacitative elements;

a second transformer for transforming an input voltage from the second bridge circuit to generate an output voltage and supplying the output voltage to the rectifier circuit; and a driving circuit for driving the first and second bridge circuits.

2. The switching power supply unit according to claim 1, wherein each of the two switching elements in the second bridge circuit is connected in parallel with each of the pair of second capacitative elements, the turn ratio between a primary winding and a secondary winding of the first transformer is different from the turn ratio between a primary winding and a secondary winding of the second transformer, and the driving circuit selectively operates the first or second bridge circuits in accordance with magnitude of the DC input voltage.

3. The switching power supply unit according to claim 2, wherein each of the two switching elements in the second bridge circuit is a field effect transistor, and each of the second capacitative elements is formed of parasitic capacitance of the field effect transistor.

4. The switching power supply unit according to claim 1, wherein the second bridge circuit further comprises a second rectifier element connected in a reversed polarity and in parallel with at least one of the pair of second capacitative elements.

5. The switching power supply unit according to claim 4, wherein the second bridge circuit comprises a field effect transistor connected in parallel with the second capacitative element, the second rectifier element is formed of a parasitic diode of the field effect transistor, and the second capacitative element is formed of parasitic capacitance of the field effect transistor.

6. The switching power supply unit according to claim 1, wherein the first switching element is a field effect transistor, and the first capacitative element is formed of parasitic capacitance of the field effect transistor.

7. The switching power supply unit according to claim 1, wherein the first rectifier element is formed of a parasitic diode of a field effect transistor.

8. The switching power supply unit according to claim 1, wherein the rectifier circuit is a center tap type rectifier circuit including two first rectifier elements.

9. The switching power supply unit according to claim 1, wherein the rectifier circuit is a full bridge type rectifier circuit including four first rectifier elements.

10. The switching power supply unit according to claim 1, wherein the first and second transformers are formed of a single magnetic device, the magnetic device comprises:

a magnetic core including a center leg part and a plurality of outer leg parts, the outer leg parts forming loop magnetic paths in cooperation with the center leg part while sharing the center leg part;

an input center leg coil wound around the center leg part and supplied with either the first AC voltage or the input voltage from the second bridge circuit;

an output center leg coil wound around the center leg part and outputting either the second AC voltage or the output voltage to the rectifier circuit;

an input outer leg coil which is wound around each of the outer leg parts and supplied with the other one of the first AC voltage and the input voltage from the second bridge circuit; and output outer leg coils each of which is wound around the outer leg part and outputting the other one of the first AC voltage and the output voltage to the rectifier circuit, wherein, the input outer leg coil is formed of a first input outer leg coil part and a second input outer leg coil part which are connected in series, the first input outer leg coil part wound around the outer leg part of a loop magnetic path, and the second input outer leg coil part wound around the outer leg part of another loop magnetic path, each of the output outer leg coils is formed of a first output outer leg coil part and a second output outer leg coil part which are connected in series, the first output outer leg coil part wound around the outer leg part of a loop magnetic path and the second output outer leg coil part wound around the outer leg part of another loop magnetic path, the first and second input outer leg coil parts are wound in the direction of the same polarity so that the numbers of turns of the first and second input outer leg coil parts are equal to each other, the first and second output outer leg coil parts in each of the output outer leg coils are wound in the direction of the same polarity so that the numbers of turns of the first and second output outer leg coil parts are equal to each other, respectively, the input outer leg coil is wound around the outer leg part so that magnetic fluxes generated in the plurality of outer leg parts by current flowing in the input outer leg coil may cancel out each other in the center leg part, and each of the output outer leg coils is wound around the outer leg part so that the magnetic fluxes generated in the plurality of outer leg parts by current flowing in the output outer leg coil may cancel out each other in the center leg part.

11. A switching power supply unit comprising:

a first bridge circuit of a full bridge type including four first switching elements and generating a first AC voltage on the basis of a DC input voltage that is input to the switching power supply unit;

first capacitative elements each of which is connected in parallel with each of the first switching elements;

a first inductor connected to the first bridge circuit so as to form an H bridge and configuring a first resonance circuit in cooperation with the first capacitative elements;

a first transformer for transforming the first AC voltage to generate a second AC voltage;

a rectifier circuit provided on a secondary side of the first transformer, including a plurality of first rectifier elements, and rectifying the second AC voltage by the plurality of first rectifier elements, thereby generating a DC output voltage that is output from the switching power supply unit;

a second bridge circuit including a pair of second switching elements connected in series and a pair of second capacitative elements connected in series, the second bridge circuit connected in parallel with the first bridge circuit;

a second inductor connected to the second bridge circuit so as to form an H bridge and constructing a second resonance circuit in cooperation with the second capacitative elements;

a second transformer for transforming an input voltage from the second bridge circuit to generate an output voltage and supplying the output voltage to the rectifier circuit; and a driving circuit for driving the first and second bridge circuit so that a current flowing in the first rectifier elements due to a resonance operation of the first resonance circuit has an opposite phase to a current flowing in the first rectifier elements due to a resonance operation of the second resonance circuit.

12. The switching power supply unit according to claim 11, wherein the rectifier circuit is a full bridge type rectifier circuit including four first rectifier elements.

13. The switching power supply unit according to claim 11, wherein the rectifier circuit is a center tap type rectifier circuit including two first rectifier elements.

14. The switching power supply unit according to claim 11, wherein the first and second transformers are formed of a single magnetic device, the magnetic device comprises:
a magnetic core including a center leg part and a plurality of outer leg parts, the outer leg parts forming loop magnetic paths in cooperation with the center leg part while sharing the center leg part;
an input center leg coil wound around the center leg part and supplied with either the first AC voltage or the input voltage from the second bridge circuit;
an output center leg coil wound around the center leg part and outputting either the second AC voltage or the output voltage to the rectifier circuit;
an input outer leg coil which is wound around each of the outer leg parts and supplied with the other one of the first AC voltage and the input voltage from the second bridge circuit; and
output outer leg coils each of which is wound around the outer leg part and outputting the other one of the first AC voltage and the output voltage to the rectifier circuit, wherein,
the input outer leg coil is formed of a first input outer leg coil part and a second input outer leg coil part which are connected in series, the first input outer leg coil part wound around the outer leg part of a loop magnetic path, and the second input outer leg coil part wound around the outer leg part of another loop magnetic path,
each of the output outer leg coils is formed of a first output outer leg coil part and a second output outer leg coil part which are connected in series, the first output outer leg coil part wound around the outer leg part of a loop magnetic path and the second output outer leg coil part wound around the outer leg part of another loop magnetic path,
the first and second input outer leg coil parts are wound in the direction of the same polarity so that the numbers of turns of the first and second input outer leg coil parts are equal to each other,
the first and second output outer leg coil parts in each of the output outer leg coils are wound in the direction of the same polarity so that the numbers of turns of the first and second output outer leg coil parts are equal to each other, respectively,
the input outer leg coil is wound around the outer leg part so that magnetic fluxes generated in the plurality of outer leg parts by current flowing in the input outer leg coil may cancel out each other in the center leg part, and
each of the output outer leg coil is wound around the outer leg part so that the magnetic fluxes generated in the plurality of outer leg parts by current flowing in the output outer leg coil may cancel out each other in the center leg part.

15. A switching power supply unit comprising:
a bridge circuit of a full bridge type for generating a first AC voltage by switching a DC input voltage inputted to the switching power supply unit;
a transformer for transforming the first AC voltage to generate a second AC voltage;
a rectifier circuit provided on a secondary side of the transformer, including a plurality of rectifier elements, and rectifying the second AC voltage by the plurality of rectifier elements, thereby generating a DC output voltage outputted from the switching power supply unit;
a surge voltage suppressing circuit connected in parallel with the bridge circuit and injecting surge voltage suppressing energy into the rectifier circuit, wherein the surge voltage suppressing energy suppresses a surge voltage applied to the rectifier elements; and
a driving circuit for driving the bridge circuit and the surge voltage suppressing circuit, wherein
the driving circuit drives the bridge circuit and the surge voltage suppressing circuit so that the surge voltage suppressing energy has a phase opposite to that of energy which amplifies the surge voltage supplied from the bridge circuit.

16. A switching power supply unit comprising:
a bridge circuit of a full bridge type for generating a first AC voltage by switching a DC input voltage inputted to the switching power supply unit;
a transformer for transforming the first AC voltage to generate a second AC voltage;
a rectifier circuit provided on a secondary side of the transformer, including a plurality of rectifier elements, and rectifying the second AC voltage by the plurality of rectifier elements, thereby generating a DC output voltage outputted from the switching power supply unit;
a surge voltage suppressing circuit connected in parallel with the bridge circuit and injecting surge voltage suppressing energy into the rectifier circuit, wherein the surge voltage suppressing energy suppresses a surge voltage applied to the rectifier elements; and
a driving circuit for driving the bridge circuit and the surge voltage suppressing circuit, wherein
the driving circuit drives the bridge circuit and the surge voltage suppressing circuit so that a reverse voltage applied to the rectifier element maintains, for a predetermined period, to be lower than a voltage determined based on the DC input voltage and the primary-side and secondary-side windings of the transformer by balancing first current and second current, the first current supplied from the bridge circuit and flowing in the direction of amplifying the surge voltage, the second current flowing in the direction of suppressing the surge voltage based on the surge voltage suppressing energy.

17. A switching power supply unit comprising:
a bridge circuit of a full bridge type for generating a first AC voltage by switching a DC input voltage inputted to the switching power supply unit;
a transformer for transforming the first AC voltage to generate a second AC voltage;
a rectifier circuit provided on a secondary side of the transformer, including a plurality of rectifier elements, and rectifying the second AC voltage by the plurality of rectifier elements, thereby generating a DC output voltage outputted from the switching power supply unit;
a surge voltage suppressing circuit connected in parallel with the bridge circuit and injecting surge voltage suppressing energy into the rectifier circuit, wherein the surge voltage suppressing energy suppresses a surge voltage applied to the rectifier elements; and
a driving circuit for driving the bridge circuit and the surge voltage suppressing circuit, wherein
the driving circuit drives the bridge circuit and the surge voltage suppressing circuit so that a reverse voltage applied to the rectifier element rises step by step through the injection of the surge voltage suppressing energy.

* * * * *